(12) United States Patent
Miller et al.

(10) Patent No.: US 8,228,926 B2
(45) Date of Patent: Jul. 24, 2012

(54) DYNAMIC LOADING FOR SIGNALING VARIANTS

(75) Inventors: Daniel Miller, Plano, TX (US);
Heriberto Aguirre, Plano, TX (US);
Ahmed Doleh, Sachse, TX (US)

(73) Assignee: Genband US LLC, Plano, TX (US)

( * ) Notice: Subject to any disclaimer, the term of this patent is extended or adjusted under 35 U.S.C. 154(b) by 1406 days.

(21) Appl. No.: 11/334,513

(22) Filed: Jan. 18, 2006

(65) Prior Publication Data
US 2007/0189196 A1    Aug. 16, 2007

Related U.S. Application Data

(60) Provisional application No. 60/670,954, filed on Apr. 12, 2005.

(51) Int. Cl.
*H04J 3/08* (2006.01)
*H04J 1/10* (2006.01)

(52) U.S. Cl. ........ 370/401; 370/474; 370/389; 370/392; 370/352

(58) Field of Classification Search .................. 370/315, 370/401
See application file for complete search history.

(56) References Cited

U.S. PATENT DOCUMENTS

| | | | |
|---|---|---|---|
| 5,140,590 A | 8/1992 | Gertsman et al. | |
| 5,375,121 A | 12/1994 | Nishino et al. | |
| 5,426,694 A | 6/1995 | Hebert | |
| 5,905,873 A | 5/1999 | Hartmann et al. | |
| 5,999,529 A | 12/1999 | Bernstein et al. | |
| 6,026,086 A | 2/2000 | Lancelot et al. | |
| 6,046,999 A | 4/2000 | Miki et al. | |
| 6,147,988 A | 11/2000 | Bartholomew et al. | |
| 6,169,754 B1 * | 1/2001 | Sugawara et al. | 370/535 |
| 6,339,594 B1 | 1/2002 | Civanlar et al. | |
| 6,351,750 B1 | 2/2002 | Duga et al. | |
| 6,614,781 B1 | 9/2003 | Elliott et al. | |
| 6,647,428 B1 | 11/2003 | Bannai et al. | |
| 6,671,367 B1 | 12/2003 | Graf et al. | |
| 6,721,282 B2 * | 4/2004 | Motley | 370/252 |

(Continued)

FOREIGN PATENT DOCUMENTS

CN    1504039 A    6/2004

(Continued)

OTHER PUBLICATIONS

Notification Concerning Transmittal of International Preliminary Report on Patentability (Chapeter I of the Patent Cooperation Treaty) for International Application No. PCT/US2006/013590 (Oct. 25, 2007).

(Continued)

*Primary Examiner* — Ricky Ngo
*Assistant Examiner* — Wutchung Chu
(74) *Attorney, Agent, or Firm* — Jenkins, Wilson, Taylor & Hunt, P.A.

(57) ABSTRACT

Methods and apparatus for dynamically loading signaling definition files for operations involving multiple signaling variants. Transmission links that transmit communications corresponding to one of several signaling variants are associated with one of several signaling definition files, where each signaling definition file corresponds to one of the signaling variants and, thus, can be employed during switching, signaling, and other processing of the communications without requiring such processing to be specifically hard-coded, or even designed, for each individual signaling variant.

21 Claims, 9 Drawing Sheets

U.S. PATENT DOCUMENTS

| | | | |
|---|---|---|---|
| 6,731,627 B1 | 5/2004 | Gupta et al. | |
| 6,765,931 B1 | 7/2004 | Rabenko et al. | |
| 6,772,320 B1 | 8/2004 | Raj | |
| 6,775,373 B2* | 8/2004 | Stoughton | 379/219 |
| 6,850,778 B1 | 2/2005 | Honkala et al. | |
| 6,865,220 B2 | 3/2005 | Abrishami | |
| 6,870,860 B1* | 3/2005 | Meagher et al. | 370/535 |
| 6,898,208 B1 | 5/2005 | Sligo et al. | |
| 6,944,190 B1* | 9/2005 | Tomar et al. | 370/535 |
| 7,006,489 B2 | 2/2006 | Li et al. | |
| 7,324,563 B2* | 1/2008 | Loeffler et al. | 370/535 |
| 7,453,884 B2* | 11/2008 | Ma | 370/395.32 |
| 7,463,590 B2* | 12/2008 | Mualem et al. | 370/241 |
| 7,466,698 B2* | 12/2008 | Ishwar et al. | 370/389 |
| 7,466,710 B1* | 12/2008 | Clemm et al. | 370/401 |
| 7,593,415 B2 | 9/2009 | Li et al. | |
| 7,650,415 B1* | 1/2010 | Peterson | 709/227 |
| 2001/0036158 A1 | 11/2001 | Hallenstal et al. | |
| 2001/0055382 A1* | 12/2001 | Oran et al. | 379/229 |
| 2002/0001302 A1 | 1/2002 | Pickett | |
| 2002/0106029 A1 | 8/2002 | Bunn et al. | |
| 2002/0172220 A1 | 11/2002 | Baker et al. | |
| 2002/0186723 A1 | 12/2002 | Sprague et al. | |
| 2002/0191768 A1* | 12/2002 | Stoughton | 379/219 |
| 2003/0007496 A1* | 1/2003 | Brown et al. | 370/401 |
| 2003/0123485 A1 | 7/2003 | Yi et al. | |
| 2003/0169751 A1* | 9/2003 | Pulkka et al. | 370/401 |
| 2003/0223432 A1 | 12/2003 | Charania et al. | |
| 2003/0233397 A1 | 12/2003 | Katz et al. | |
| 2004/0031030 A1 | 2/2004 | Kidder et al. | |
| 2004/0044793 A1 | 3/2004 | Pauly et al. | |
| 2004/0100914 A1 | 5/2004 | Hellwig et al. | |
| 2004/0252681 A1 | 12/2004 | Rabipour et al. | |
| 2005/0033822 A1 | 2/2005 | Grayson et al. | |
| 2005/0074017 A1 | 4/2005 | Qian et al. | |
| 2005/0114853 A1 | 5/2005 | Glider et al. | |
| 2005/0141569 A1* | 6/2005 | Meagher et al. | 370/907 |
| 2005/0216896 A1 | 9/2005 | Doleh | |
| 2006/0013164 A1* | 1/2006 | Paryani | 370/329 |
| 2006/0209788 A1* | 9/2006 | Boldt et al. | 370/352 |
| 2006/0227719 A1* | 10/2006 | Halbraich | 370/252 |
| 2007/0086445 A1* | 4/2007 | Mattaway et al. | 370/352 |
| 2007/0127436 A1* | 6/2007 | Karimi-Cherkandi et al. | 370/352 |
| 2008/0080829 A1* | 4/2008 | Smith et al. | 385/135 |

FOREIGN PATENT DOCUMENTS

| | | |
|---|---|---|
| CN | ZL 02808634.1 | 4/2009 |
| DE | 198 29 822 A1 | 1/2000 |
| EP | 1 017 217 A2 | 7/2000 |
| EP | 1355479 A1 | 10/2003 |
| EP | 1 364 499 B1 | 7/2009 |
| GB | 2363295 | 12/2001 |
| WO | WO 99/291326 | 6/1999 |
| WO | WO 02/039588 A3 | 9/2002 |

OTHER PUBLICATIONS

Notice of Allowance and Fee(s) Due for U.S. Appl. No. 11/297,941 (May 15, 2009).
Final Official Action for U.S. Appl. No. 11/297,941 (Jan. 22, 2009).
Communication under Rule 71(3) EPC for European Patent Application No. 02 709 657.7 (Jan. 9, 2009).
Notice of Grant of Patent Right for Invention for Chinese Patent Application No. 02808634.1 (Dec. 26, 2008).
Official Action for Chinese Patent Application No. 02808634.1 (Jun. 20, 2008).
Official Action for U.S. Appl. No. 11/297,941 (May 1, 2008).
Final Official Action for U.S. Appl. No. 10/809,963 (Jan. 23, 2008).
Non-Final Official Action for U.S. Appl. No. 10/809,963 (Jun. 27, 2007).
International Search Report for International Application No. PCT/US2006/028549 (Dec. 11, 2006).
Communication pursuant to Article 96(2) EPC for European Application No. 02709657 (Jan. 23, 2006).
Notice of Allowance and Fee(s) Due for U.S. Appl. No. 09/792,265 (Sep. 16, 2005).
Final Official Action for U.S. Appl. No. 09/792,265 (Jun. 15, 2005).
"Third Generation Partnership Project; Technical Specification Group Core Network and Terminals; Interworking Between the IP Multimedia (IM) Core Network (CN) Subsystem and Cirecuit Switched (CS) Networks (Release 6)" 3GPP TS 29.163, pp. 1-128 (Jun. 2005).
Agilent Technologies, "UMTS Network and Service Assurance," International Engineering Consortium, http://www.iec.org/online/tutorials/agilent_umts_network/topic03.html, pp. 1-4 (Copyright 2005).
"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications ETSI TS 126 202, pp. 1-14 (Dec. 2004).
Non-Final Official Action for U.S. Appl. No. 09/792,265 (Oct. 4, 2004).
Notification of Transmittal of International Preliminary Examination Report for International Application No. PCT/US02/05410 (Dec. 5, 2003).
Written Opinion for International Application No. PCT/US02/05410 (Jun. 13, 2003).
Notification of Transmittal of the International Search Report or the Declaration for PCT/US02/05410 (Dec. 27, 2002).
Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).
"Third Generation Partnership Project," Meeting Report v3.0.0, 3GPP TSG-TrFO Workshop#04, pp. 1-18 (Oct. 17-19, 2000).
Laurence, M. et al., "Voice Over ATM: A Hybrid TDM/ATM Design Approach," electronic Engineering, Morgan-Grampian Ltd., vol. 71, No. 869, pp. 81-82, 84, and 86 (Jun. 1999).
Singer, Josef et al., "Narrow band Services Over ATM Networks: Evaluation of Trunking Methods," World Telecommunications Congress, vol. 2, pp. 17-25 (Sep. 21, 1997).

* cited by examiner

DYNAMIC LOADING FOR SIGNALING VARIANTS

CROSS-REFERENCE TO PRIORITY AND RELATED APPLICATIONS

This application claims the benefit of commonly-assigned U.S. Provisional Application No. 60/670,954, entitled "DYNAMIC LOADING FOR SIGNALING VARIANTS," filed on Apr. 12, 2005, the entirety of which is hereby incorporated by reference herein.

This application is also related to commonly-assigned U.S. patent application Ser. No. 09/792,265, entitled "VOICE PACKET SWITCHING SYSTEM AND METHOD," filed on Feb. 23, 2001, the entirety of which is hereby incorporated by reference herein.

This application is also related to commonly-assigned U.S. patent application Ser. No. 10/809,963, entitled "DATA COMMUNICATION VIA TRANSLATION MAP EXCHANGE," filed on Mar. 26, 2004, the entirety of which is hereby incorporated by reference herein.

BACKGROUND

Media gateways and other switching apparatus are employed to switch TDM and other types of data in, for example, a circuit-switched network. They are often designed for specific needs, such as known or projected traffic demands of one or more PSTN networks, as well as various protocols associated with one or more networks.

Class 4 and class 5 switches use multiple signaling schemas to communicate physical line status and route information. Information communicated between two switches may be sent in-band (on the physical line) or out-of-band (using a separate digital channel). In either case, the signaling information contains two separate and unique items: the physical line signaling information (commonly referred to as the line signal information) and the route information (commonly referred to as the register signal information).

For example, channel-associated-signaling (CAS) involves the transmission of signaling information associated with a voice channel. Signaling System R2 (R2) is a CAS system that includes line signaling and register signaling. An originating port sends "forward signals" in a direction towards the called party and receives "backward signals" in a direction towards the calling party. By this convention, a terminating port sends backward signals in a direction towards the calling party, and receives forward signals in a direction towards the called party. An originating port or calling party may also be referred to herein as the originating party, the origin, the source, the outgoing switch, egress, and the like. A terminating port or called party may also be referred to herein as the terminating party, the destination, the incoming switch, ingress, and the like.

In a general sense, CAS line signaling (e.g., in an R2 system) employs a signaling channel to send and receive four bit values (e.g., "ABCD"). For example, an E1 facility transmits the bit values via "timeslot 16," whereas a T1 facility robs bits from each time slot (e.g., robs 4 bits from each of 24 PCM samples) to accomplish the same objective.

The ITU/CEPT has standardized an inter-nation form of R2. However, there is no multinational standard for R2 signaling regarding calls that originate and terminate within a single nation's borders. Consequently, a large variety of R2 national variants have developed over the past several decades. Thus, the assignment of the ABCD signals to the standard call-progress events are quite different for each R2 variant within a specific country, and even more different from one country to the next. The wide variation of R2 variants also presents complexities during register signaling.

For example, the information contained within the line signal information and the register signal information includes both standard and non-standard information. Thus, for example, a switch is often required to implement the signaling in several fragments: one fragment to handle the standard information, and several fragments to handle the non-standard, different variations of each signaling method.

Consequently, CAS signaling systems (and specifically R2 systems) are generally designed for the individual variants that are specific to the country or region in which the CAS signaling system will operate. However, due to the large number of different variants, designing the system for the particular combination of variants corresponding to the country or region is exceedingly complex, possibly requiring thousands of man-hours. Similar complexities exist with non-CAS systems, such as common channel signaling (CCS) systems like ISDN/PRI and SS7 systems, among others, as well as other signaling systems.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
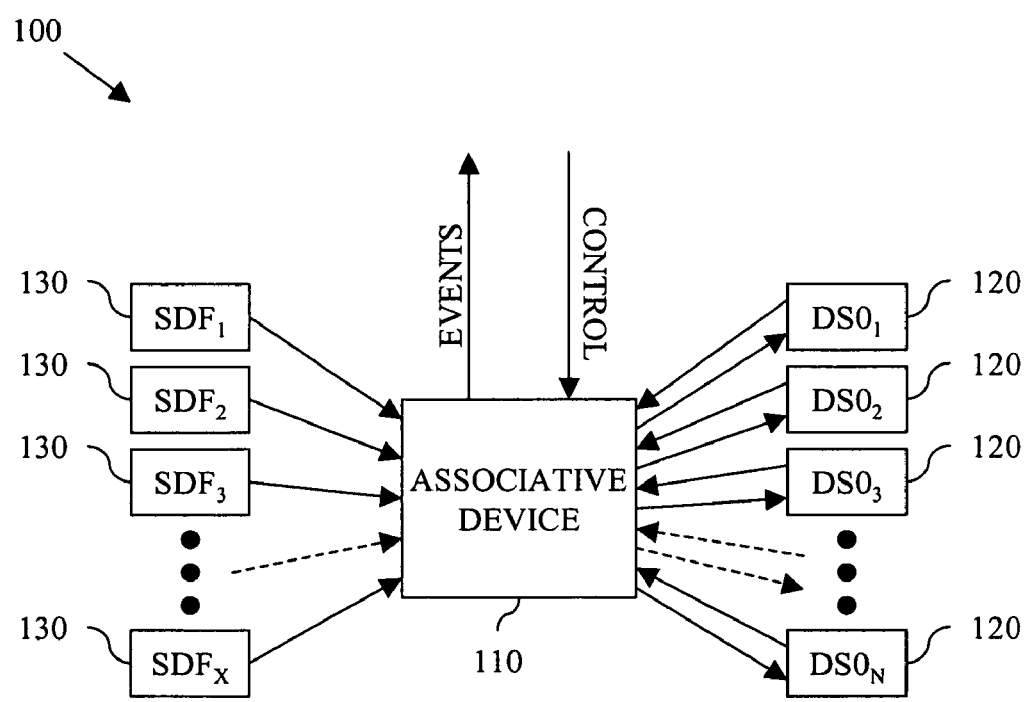
FIG. 1 is a schematic view of at least a portion of an embodiment of apparatus according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, illustrated is a schematic view of at least a portion of an embodiment of apparatus 100 according to aspects of the present disclosure. The apparatus 100 may be or include a media gateway comprising and/or operating as one or more switches and/or other switching fabric components, IP gateways and/or other gateways, channel banks, signaling devices, and/or other devices. Such a media gateway may convert data from a format and/or protocol required for one network to another format and/or protocol required for another network. For example, the media gateway may convert data from a first type of data on a first transmission link to a second type of data on a second transmission link. The media gateway may terminate channels from a circuit-switched network, and may also pass streaming media for a packet-switched network, such as RTP streams in an IP network. Input data for the media gateway may include audio, video, and/or T.120 (real-time multi-point communications), among others, which the media gateway may handle simultaneously or otherwise. The media gateway may primarily or only serve a PSTN network, but may be reconfigurable to also serve other networks.

As employed herein, a network may refer to an entire network, or to a network portion, a network application, and/or network apparatus. To that end, one or more instances of the apparatus 100 or components thereof, or other embodiments of the apparatus 100 within the scope of the present disclosure, may be singularly or collectively employed to bridge two or more networks, including those of PSTNs, among others. PSTN networks may employ TDM and/or PCM, among other non-packet formats and/or protocols.

The apparatus 100 includes an associative device 110 configured to bind or otherwise associate each of a number N of DS0s or other transmission links 120 to a corresponding one of a number X of signaling definition files (SDFs) 130. The associative device 110 may be a generic state interpreter (GSI) and/or a virtual machine (VM), possibly dependent upon whether the apparatus 100 is configured for line signaling operations, register signaling operations, or both. The numbers N and X may vary within the scope of the present disclosure. For example, the numbers N and X may be substantially equal. However, the number N may also be substantially less than or greater than the number X.

Each SDF 130 may be or include a line signaling definition file (LSDF), such as where the associative device 110 is at least operable for line signaling operations. Alternatively, or additionally, each SDF 130 may be or include a register signaling definition file (RSDF), such as where the associative device 110 is at least operable for register signaling operations. Where the apparatus 100 is configured for both line and register signaling operations, the SDFs 130 may collectively include LSDFs and RSDFs. In one embodiment, a single SDF 130 (or more) may include information regarding or otherwise related to both line signaling and register signaling.

Each SDF 130 includes information regarding or otherwise related to a specific signaling system variant (also referred to herein as a signaling variant, or simply a variant). For example, where the apparatus 100 is configured for operations in an environment in which seven (7) R2 variants exist (or are selected for use), the apparatus 100 may be configured for operations with seven SDFs (i.e., X=7). In a similar embodiment, the apparatus 100 may be configured for operations with fourteen SDFs (i.e., X=14), such as seven LSDFs and seven RSDFs.

The information included in each SDF 130 may pertain to how the associative device 110 should interpret, process, or otherwise handle the different variants that correspond to voice and/or signaling data received via the DS0s 120. For example, the apparatus 100 may rely on the SDF information to monitor and/or govern the events, control and/or states of the apparatus 100. Additionally, or alternatively, the apparatus 100 may rely on the SDF information to monitor and/or govern the events, control and/or states of a system associated with the apparatus 100 (e.g., a media gateway), such as in support of signaling and/or switching operations. Consequently, each SDF 130 accessed by the associative device 110 (including indirect access via another portion of the apparatus 100) may correspond to a signaling variant with which the apparatus 100 operates. However, this 1:1 ratio of SDFs 130 and signaling variants may not exist in every embodiment within the scope of the present disclosure.

It follows from aspects described above that, at least according to some aspects of the present disclosure, the complexity and resources (time, costs, labor, hardware, and so forth.) associated with the design, maintenance, and updating of the apparatus 100 can be substantially minimized. That is, a core design for the apparatus 100 (and/or the system in which the apparatus 100 is employed) can be developed substantially without the burdensome considerations of the specific signaling variants which will be encountered in the operating environment, because the unique details of each signaling variant can be scripted into the SDFs 130 and interpreted by the associative device 110 for subsequent use that is not dependent upon a specific variant. Moreover, if the environment or application in which the apparatus 100 is employed demands the ability to operate with alternative or additional variants, SDFs 130 corresponding to such variants can supplement or replace the existing SDFs 130, substantially or completely eliminating the need for more substantial and complex redesign of the apparatus 100 or the system in which the apparatus 100 operates. Thus, one or more SDFs 130 can be dynamically loaded on an as-needed basis without simultaneously incurring the burden of reconfiguring the remainder of apparatus 100 or the system in which apparatus 100 operates.

Aspects described above and others within the scope of the present disclosure are also applicable and/or readily adaptable to non-CAS systems, such as CCS and/or packet systems, like ISDN/PRI and SS7 systems. In a general sense, CCS uses a dedicated channel to carry signaling information as opposed to piggybacking the information on the data payload.

Thus, in one embodiment in which packet-oriented signaling is employed, such as with a ISDN/PRI or SS7 system, the packets can be analyzed at a sub-packet level, such that the building blocks of the packets may be described in the SDFs 130. The associative device 110 may then process the SDFs 130 and generate, control and/or monitor the required or desired behavior for each variant. However, for the sake of simplicity, many aspects are described herein in the context of an R2 system and/or the R2 variants corresponding thereto. Nonetheless, such an approach is not limiting to the scope of such aspects nor the remainder of the present disclosure. Moreover, in a similar sense, the signaling system variants described herein may correspond to inbound signaling, outbound signaling, or both.

Figure 2:
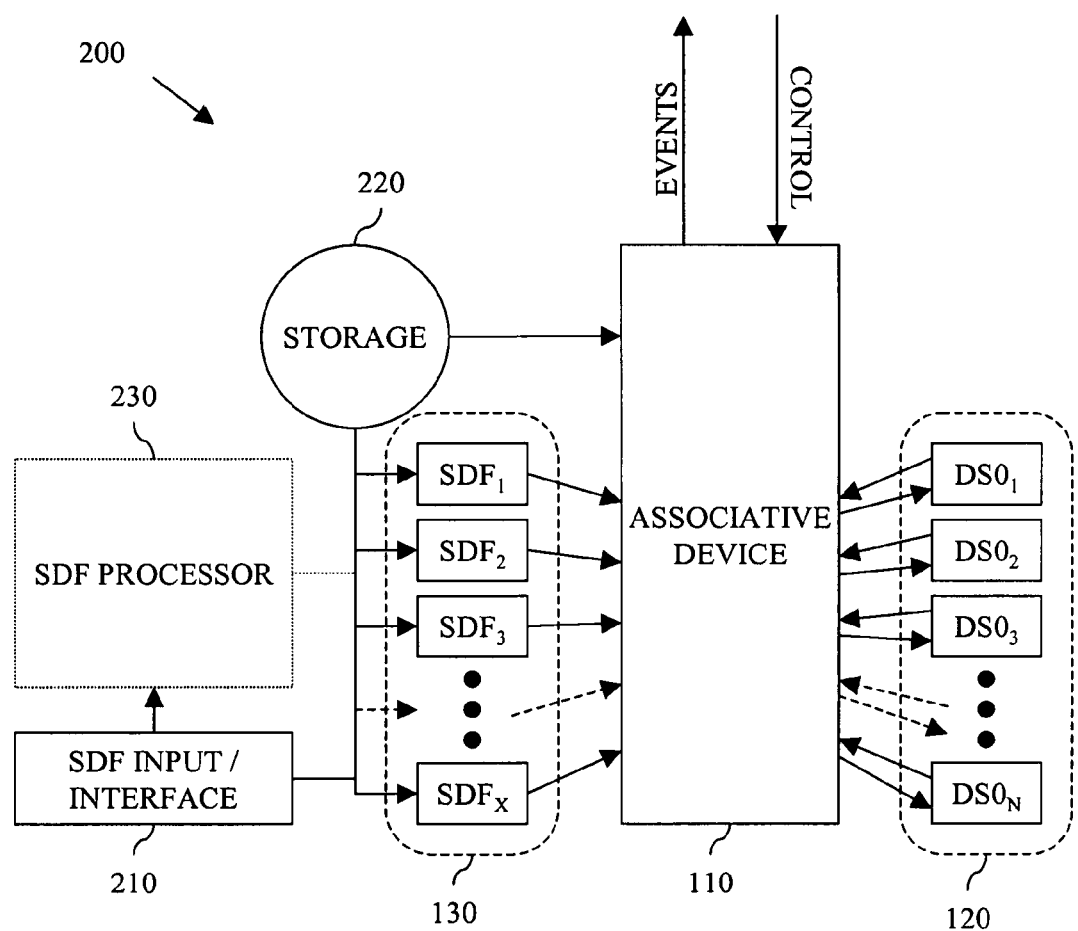
FIG. 2 is a schematic view of at least a portion of an embodiment of apparatus according to aspects of the present disclosure.

Referring to FIG. 2, illustrated is a schematic view of at least a portion of an embodiment of the apparatus 100 shown in FIG. 1, herein designated by the reference numeral 200. The apparatus 200 is substantially similar to the apparatus 100 shown in FIG. 1, except possibly as described below.

The apparatus 200 includes an SDF input 210. In other embodiments, the apparatus 200 may merely include an interface to the SDF input 210. The SDF input 210 may be a textual and/or graphical user interface operable to script the SDFs 130. Alternatively, or additionally, the SDF input 210 may be configured to input (e.g., install, load, etc.) the SDFs 130 into the apparatus 200, either individually or collectively (e.g., batch input), whether or not the SDF input 210 is also operable to script the SDFs 130.

The SDFs 130 may thereafter be stored within apparatus 200, such as in permanent memory (e.g., ROM). Each SDF 130 may then be loaded into operating memory (e.g., RAM) when the apparatus 200 starts up, for example. For the sake of simplicity, such permanent memory and operating memory are schematically depicted in FIG. 2 as a single "storage" function 220. However, those skilled in the art will readily recognize that permanent and operating memories are seldom integrated in the sense shown in FIG. 2, and that memory and storage configurations other than as depicted in FIG. 2 are within the scope of the present disclosure.

In the alternative to loading each SDF 130 from the storage 220 when the apparatus 200 is "booted," or in addition to loading each SDF 130 from the storage 220 when the apparatus 200 is "booted," each SDF 130 may be "called" or otherwise loaded into operating memory on an as-needed basis, such as when a particular R2 variant corresponding to the SDF 130 is encountered. A combination of this start-up loading and repetitive calling may also be employed. Moreover, as with the apparatus 100 described above with respect to FIG. 1, the apparatus 200 may be initially configured for a particular set of R2 variants and subsequently reconfigured for additional and/or alternative R2 variants by loading additional and/or alternative R2 variants via the input/interface 210. Such loading may be dynamic in the sense that the apparatus 200 need not be shut down to load the new SDFs corresponding to the new R2 variants. Alternatively, or additionally, such loading may be dynamic in the sense that expanding or modifying the set of R2 variants of a particular operating environment may not require that the remainder of the apparatus 200 be substantially reconfigured, possibly requiring no reconfiguration whatsoever.

In embodiments in which the apparatus 200 includes storage 220 for containing each SDF 130, each SDF 130 may be initially loaded into storage 220 prior to or during start-up of the apparatus 200 and/or thereafter, and may be subsequently called or otherwise accessed when needed. Thus, storage 220 may be configured to communicate directly with the associative device 110, such as where the input/interface 210 may not communicate directly with the associative device 110.

The apparatus 200 may also include one or more components, features or functions for processing one or more SDFs 130 upon input, possibly prior to storage. Such aspects of the apparatus 200 are depicted in FIG. 2 by component 230, which may comprise more than one component, feature and/or function. The component 230 may be operable with individual ones of the SDFs 130, and may additionally or alternatively be simultaneously operable with groups of the SDFs 130 (e.g., batch processing) or all of the SDFs 130 simultaneously.

For example, the component 230 of FIG. 2 may represent one or more compiler functions which, among other possible aspects, may convert a textual SDF 130 into a binary SDF 130 that has been input via input/interface 210 prior to loading and/or storing the SDF 130 in the apparatus 200. Consequently, at least in some embodiments, each SDF 130 may be loaded and/or stored in the apparatus 200 in a format, protocol, status, state, etc. that does not require compiling each time the SDF 130 is accessed. In one embodiment, the component 230 may be or function as a specific protocol compiler (or several of such). For example, the specific protocol compiler may include a parser or parsing function to perform error checking, such as to check the accuracy of grammar or to ensure all necessary input has been provided in a particular file. The compiler may then perform the actual compilation or conversion of the graphical or textual file into a binary and/or executable file. The compiler may thus at least partially resemble a general computer programming language compiler, although such resemblance MAY fade in the domain of telecommunications signaling protocol.

The component 230 of FIG. 2 may alternatively or additionally represent one or more conversion functions which, among other possible aspects, may convert the data of one or more SDFs 130 between one or more programming and/or machine languages, among others. Thus, in some embodiments, the dynamic loading of SDFs 130 may not be encumbered or otherwise limited by the capabilities of a particular user or native language.

The component 230 of FIG. 2 may alternatively or additionally represent one or more data compression and/or decompression functions which, among other possible aspects, may offer time and other resource savings pertinent to existing and future-developed data compression technology. For example, SDFs corresponding to variants in one part of the world may also be used in other parts of the world. The ability to electronically transmit such SDFs across one or more regions or countries can eliminate duplicative clean-sheet SDF development activities, and data compression/decompression capabilities can facilitate such transmission. Thus, for example, one or more SDFs may be multicast or broadcast to several instances of the apparatus 200 to configure each apparatus for operations with a particular one or more R2 variants corresponding to the one or more broadcasted SDFs. Thus, at least in this context, the SDF input/interface 210 may be a telecommunications interface, such as a network interface configured to receive (and possibly send) PCM data and signaling, packet data and signaling, and/or other types of data and signaling.

The component 230 of FIG. 2 may alternatively or additionally represent one or more data encoding, decoding and/or transcoding functions, and/or one or more data encryption functions. Moreover, such data compression, coding and/or encryption functions may also expedite processing internal to the apparatus 200, at least in some embodiments. Alternatively, or additionally, the component 230 may represent one or more other functions existent in the apparatus 200 but possibly not explicitly described above. Embodiments of the apparatus 200 including such functions are also within the scope of the present disclosure.

Figure 3:
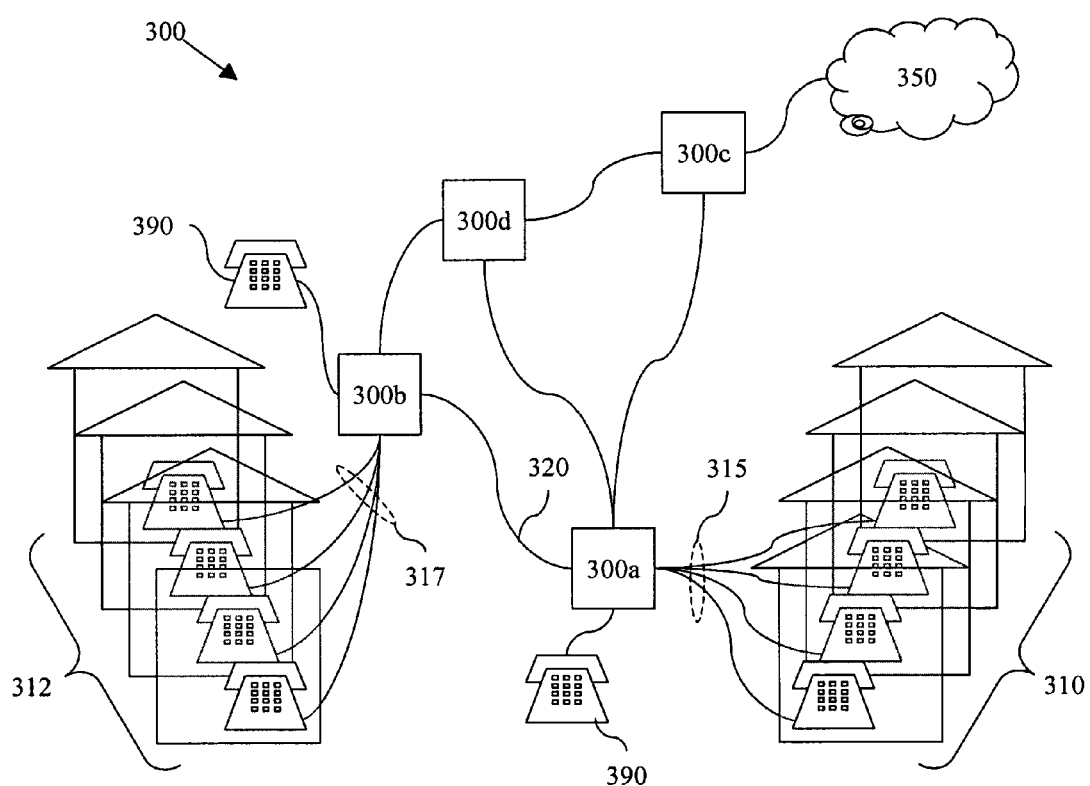
FIG. 3 is a schematic view of at least a portion of an embodiment of apparatus according to aspects of the present disclosure.

Referring to FIG. 3, illustrated is a schematic diagram of at least a portion of an embodiment of a network 300 according to aspects of the present disclosure. The network 300, which may include several networks and/or portions of networks, is one environment in which the apparatus 100 of FIG. 1 and/or the apparatus 200 of FIG. 2, or aspects thereof, may be implemented according to aspects of the present disclosure. For example, the network 300 includes apparatus 300a-d, where aspects of each of the apparatus 300a-d may be substantially similar to aspects of the apparatus 100 and/or 200 described above. Some embodiments of the network 300, however, may not include each of the apparatus 300a-d.

The apparatus 300a is connected by a plurality of loops 315 to one or more PSTN access networks 310 that may include a plurality of residential telephones and/or business exchanges (PBX). In one embodiment, the telephones may be grouped by digital loop carriers, PBXs, and/or other aggregators which may be included in one or more of the PSTN access networks 310, or may otherwise be configured to communicate with the apparatus 300a through a PSTN network 310. The loops 315 may include digital loops and/or analog loops, and may be configured to transmit TDM and other PSTN data, among others. Thus, the apparatus 300a may be, or may be employed as, a central office switch, or a Class 5 switch. Accordingly, any PSTN access network 310 connected to the apparatus 300a may communicate with another PSTN access network 310 connected to the apparatus 300a.

The apparatus 300a is also connected to the apparatus 300b by a trunk or other transmission line 320. The apparatus 300b is, in turn, connected to a plurality of residential telephones, business PBXs, digital loop carriers, and/or PSTN access networks 312 (hereafter collectively referred to as PSTN access networks 312, although merely for the sake of simplicity) by a corresponding plurality of loops 317, which may each be substantially similar to one or more of the loops 315. Thus, any of the PSTN access networks 310 may communicate with any of the PSTN access networks 312 via the apparatus 300a and 300b, the trunk 320, and corresponding ones of the loops 315, 317. As also shown in FIG. 3, a telephone or other personal telecommunications device 390 may also be directly connected to the apparatus 300a.

The apparatus 300c and/or 300d may each be deployed as a media gateway to interconnect a PSTN or other type of network 350. The apparatus 300c and/or 300d may each also or alternatively be deployed as a tandem media gateway or Class 4 switch to interconnect a local access PSTN network (e.g., network 310) to tandem network 350 (e.g., via apparatus 300a).

As also shown in FIG. 3, one or more telephones or other personal telecommunications devices 390 may also be directly connected to one or more of the apparatus 300a and 300b (among others). Consequently, the telecommunications devices 390 may be connected via one or more of the apparatus 300a-d and a connecting trunk but without the loops 315, 317. Moreover, the signaling between telecommunications devices 390 connected in such a manner, and otherwise for other connections between two or more of the apparatus 300a-d, may be via a CAS signaling system, possibly an R2 signaling system, or a CCS signaling system, among others.

Aspects of the approach introduced by the present disclosure entail an implementation that provides a substantially unified signaling interpreter that is loaded or otherwise implemented in, for example, a media gateway, such as those including the apparatus 100 of FIG. 1, the apparatus 200 of FIG. 2, and/or the apparatus 300a-d shown in FIG. 3. The interpreter is configured to accept loadable signaling definition files containing information regarding the processing of signaling information of each signaling variant. This approach may remove the interdependency between different signaling variants.

This approach may also be applicable to both line signal information and register signal information, and also to packet-oriented signaling such as PRI and SS7. In a packet-oriented signaling environment, this approach may, effectively, break down packets into basic components and then provide operations on these components. These components, or operations therewith, are what are described in the corresponding signal definition file. One or more associative devices may process the signal definition files and/or generate behavior required for each variant.

One example of such an associative device may be implemented as or with two separate interpreters: a line-signaling interpreter and a register signaling interpreter. The following description provides at least a portion of an implementation of an in-band line-signaling interpreter and its associated line signaling definition files used by such interpreter. The following description also provides at least a portion of one embodiment of a method to create a state sequencer that can be implemented in software and/or hardware to provide standard telecom events to the media gateway (e.g., to a class 4 or class 5 system) regardless of which line signaling system is used. The state sequencer is implemented using a generic signaling interpreter (GSI) and a line signaling descriptors file (LSDF) as two independent parts, although other methods and state sequencer embodiments are also within the scope of the present disclosure. One or more aspects of the GSI may be substantially similar to those of the associative device 110 shown in either of FIGS. 1 and 2. Moreover, one or more aspects of the LSDF may be substantially similar to those of the SDFs 130 shown in either of FIGS. 1 and 2.

The LSDF may be built offline to encode the line signaling operation and behavior of a particular signaling system. One or more LSDFs may then be loaded into a switch or media gateway to support different signaling variants. The LSDF contains line signaling description information using the GSI language (constructs and grammar). For example, the description may specify the signaling states, the inbound signaling events, the outbound signaling data, the state "entry" and "exit" criteria. The LSDF may then be compiled to generate the files that will be dynamically loaded by the GSI when needed. Compiling may help minimize run-time impact on the GSI.

The GSI controls the signaling states for the switch or media gateway, possibly on a per-channel or per-DS0 basis, such as by binding a DS0 (e.g, DS0s 120 shown in either of FIGS. 1 and 2) with a corresponding LSDF. Once bound, the DS0 standard telecom signaling instructions may move a DS0 signaling state machine (SSM) through the LSDF-defined states. In each defined state, the GSI may evaluate incoming "ABCD" according to the LSFD event definitions and/or generate standard telecom signaling events defined by the LSFD once the LDSF event is reached.

Aspects of this method may allow the GSI to implement a universal signaling interface (USI) that can support multiple signaling schemas. The following are examples of the initial GSI commands that a signaling descriptor may utilize. Additional commands may be added to the GSI, possibly as the GSI is enhanced, such as to take advantage of additional signaling features that are part of some rare signaling variants. The additional commands may become a part of the GSI global language library, and may be available to all variants.

It may be useful to some readers to envision the DS0 in-band signaling as a signaling state machine (SSM). This SSM may be initialized at the start of the DS0 binding to the LSFD. The SSM may then move from one defined signaling state into another under the control of the GSI and the LSDF.

USI Commands (Telecom System to GSI)

For commands that may have LSDF implementation, the following is one embodiment of a minimum set of system commands that are supported by the GSI. These commands may be used by the switching system to control the SSM. The LSDF may have an implementation for CMD_INIT, a com mand to initialize the SSM. This command may be accepted by the GSI regardless of the state of the SSM. The SSM may move into a well-known state defined by the LSDF (such as an ALARM state). When the SSM reaches such state, it may emit a telecom event that indicates the current state of the machine (such as SYS_ALARM). During the initialization, the GSI sends the in-band signal defined by the LSDF to the remote port (such as a signal of BLOCK, ALARM, or IDLE, depending on the variant).

The remaining commands may be optional to the LSDF. If the command is not supported, no error may be emitted. If the command is supported, then the command may be accepted or rejected by the SSM depending on the current state of the SSM. If the command is rejected (possibly indicating that the system and the SSM are not in a synchronous state), then the system may re-initialize (e.g., CMD_INIT) the SSM. The following is a list of system commands that may or may not be supported by the LSDF.

| | |
|---|---|
| CMD_IDLE | May be used to move the SSM into its idle state. When the SSM reaches the IDLE state, it may emit the idle event to the system. The system may be required or otherwise configured to wait for the SSM to reach the IDLE state before issuing another command or has the option to issue the CMD_INIT command. |
| CMD_SEIZURE | May be used to seize a port in preparation to originate a call. Normally, the system may be required to wait for the seizure ACK, indicating the remote port has accepted the seizure request. |
| CMD_SEIZUREACK | May be sent in response to a seizure event to inform the far end that this system has accepted the remote seizure. At this point, the system may move into an addressing state and, therefore, may be required or otherwise configured to collect address information. |
| CMD_ANSWER | May be used to place the port in the answer/talk state. This command may be applicable to the originating and terminating ports. On the originating port, this command may be sent as a response to an answer event. On the terminating port, this command may be sent after the system has collected the required digits and is ready to move to the talk state. |
| CMD_METERANSWER | May be used to place the port in the metered answer/talk state. This command may be applicable to the terminating ports. This command may be sent after the system has collected the required digits and is ready to move into the metered talk state. It may be expected that the system will issue a CMD_METER command during this talk state. |
| CMD_CLEAR | May inform the SSM that the system is trying to clear the circuit. For originating circuits, this may translate into a CLEAR FORWARD signal, and for terminating ports, this may translate into a CLEAR BACKWARD or IDLE signal. For originating ports, the system may expect the SSM to report idle or fault events. For terminating ports, the system may expect the SSM to return a clear event, indicating that the upstream port has cleared. |
| CMD_BLOCK | May instruct the SSM to send a blocking signal to the remote side. The system may be required remove the block before any other commands are sent to this machine. |
| CMD_RINGON | May be valid for originating ports that are in the seized state (after sending the CMD_SEIZURE) and will emit the RING signal. |
| CMD_RINGOFF | May be valid for originating ports that are in the seized state (after sending the CMD_SEIZURE) and will emit the RING OFF signal. |
| CMD_FALSH | May be valid after the CMD_ANSWER and causes the SSM to send a flash signal to the remote port. If the flash signal is not supported by the machine, the command may be ignored. |
| CMD_METER | May be valid after the CMD_METERANSWER on the terminating port. This command may cause a predefined meter pulse to be emitted to originating equipment. |
| ADDITIONAL commands | May be defined later as the SSM description matures. However, the following principle may be required to apply: if the command is not defined, it is ignored; if the command is defined but must be rejected, then an event is sent back to the system and the machine is not changed. |

GSI Commands for LSDFs

The following commands for the GSI and may be applicable to binding a DS0 to a specific LSDF, loading an LSDF, and/or removing an LSDF from the system.

| | |
|---|---|
| INITIALIZE_GSI | May be employed to initialize the GSI. |
| SETUP_SIGNALING_LSDF | May be employed to inform the GSI that a new LSDF is available for binding. After this command is issued, the new LDSF file may be loaded into memory. The LSDF may also be required to be enabled before it is available for binding. |
| SHUTDOWN_SIGNALING_LSDF | May be employed to inform the GSI that no additional bindings are allowed to a particular LSDF. Current calls may proceed until termination. Once the DS0 SSM reaches the IDLE state, the DS0 binding may be removed. |
| ENABLE_LSDF_BINDING | May be employed to allow DS0 binding to a particular LSDF. |
| REMOVE_SIGNALING_LSDF | May be employed to remove the access and binding to a particular LSDF. Any DS0 that is bound to the particular LSDF may have its binding removed, and possibly moved into an "unavailable" state. |

-continued

| | |
|---|---|
| MOVE_TO_STANDBY | May be employed to inform the GSI that the system has moved from primary mode to standby mode. |
| MOVE_TO_ACTIVE | May be employed to inform the GSI that the system has moved from the standby mode to the primary (active) mode. |

Commands for Binding/Unbinding DS0 with LSDF

The following commands may be employed to bind or unbind a DS0 and an LSDF.

| | |
|---|---|
| INIT_DS0_LSDF | May be employed to bind a DS0 to an LSDF. If the LSDF is not available, the DS0 may be placed in hold mode until the LSDF becomes available. |
| STOP_DS0_LSDF | May be employed to unbind an LSDF from a DS0. |

System/Hardware Events Command

The RAW_LINE_SIGNALING command may be sent to the GSI to inform it about system/hardware events that may be processed according to a bound LSDF. The command may be employed to pass raw signaling collected from the hardware to the GSI. The GSI may utilize this information in conjunction with the LSDF, and may start a timing function or move the SSM to a new state.

LSDF-Specified Events

In addition to the above commands, the following are events that may be specified in an LSDF and/or generated by an LSDF/GSI to inform the system of signaling status changes.

| | |
|---|---|
| SYS_ALARMED | May indicate that the SSM has reached an ALARMED state (such as by receiving an alarm signal from the remote port.) The system may be required to not terminate any calls to this port until the ALARM event is cleared. |
| SYS_IDLE | May indicate that the SSM has reached an IDLE state. |
| SYS_SEIZURE | May indicate that a remote seizure has been received. |
| SYS_SEIZUERACK | May indicate that a remote port has acknowledged local seizure. |
| SYS_RING | May indicate that a ring condition has been received. |
| SYS_FLASH | May indicate that a flash signal has been received. |
| SYS_WINK | May indicate that a WINK signal has been received. |
| SYS_ANSWER | May indicate that a signaling machine has received an event that moved the signaling machine to the ANSWER state. |
| SYS_METERANSWER | May indicate that a signaling machine has received an event that moved the signaling machine to the METERANSWER state. |
| SYS_METER | May indicate that a METER signal has been received. |
| SYS_CLEAR | May indicate that a CLEAR signal has been received from a remote port. This signal may be required to be interpreted differently depending on the forward or backward state of the machine. |
| SYS_BOCK | May indicate that a BLOCK event has been received and that the SSM has moved into the BLOCKED state. |
| SYS_FAULT | May indicate that the SSM has reached a fault state, and/or that the incoming signaling is not conformant to the SSM sequencer. The system may be required issue a CMD_INIT to transition out of this state. |
| SYS_SHOWERING | May indicate that the SSM has detected a showering condition on the physical line. The SSM may ignore all inbound ABCD events from this point forward until the showering ends. The system may then place the DS0 out of service. |
| SYS_SHOWERINGENDS | May indicate that the SSM has detected the end of a showering condition on the physical line. The system may then place the DS0 back in service. |
| SYS_INVALIDSIGNAL | May indicate that the SSM has detected an invalid signal condition on the physical line. The system may then place the DS0 out of service. |
| SYS_VALIDSIGNALESTABLISHED | May indicate that the SSM has detected a valid signaling condition on the physical line. The system may then place the DS0 in service. |

GSI-Specified Events

Events generated by the GSI may be utilized to inform the system about the status of the SSM and allow the system to take the appropriate action. These events may be implementation-dependent, and may include the following.

| | |
|---|---|
| SSM_OUTBOUNDSIGNALINGCHANGED | May be utilized to inform the system that the outbound signal has changed, and should possibly be copied to the physical hardware. This isolation may be required to render this SSM universal and implementation-independent. The system may retrieve the actual ABCD signal value from the SSM driver. |
| SSM_NOTAVAILABLE | May indicate that the SSM is no longer valid and may not used. This may occur when the LSDF has not been loaded into the GSI correctly. |
| SSM_AVAILABLE | May be utilized to indicate that the SSM is (or has become) available. The user/system may then be required to issue CMD_INIT to initialize the SSM for usage. |
| SSM_SHUTDOWN | May inform the system that the SSM is about to be changed. If the system DS0 is idle, the system may be required to sign out of this SSM, and re-register into the new SSM. |
| SSM_FORCECLEAR | May inform the system that an LSDF is being taken offline, and that the system must clear all access immediately. |

GSI Language Constructs

The following description regards the GSI language constructs that may be utilized to build the LSDF. However, the language constructs set forth below are merely examples, and can be implemented differently in other embodiments within the scope of the present disclosure. Nonetheless, the main GSI concepts may still hold.

Several proprietary SSMs can require that some timers and unique counters be defined per user/port. To address this requirement, each SSM may define it own list of signaling configuration variables, which may be configured by the user and may be initialized per SSM usage.

The LSDF may define all needed variables, and each variable may be given a local name. These names may be LSDF instance specific, and may have no meaning outside the LSDF. The names may be utilized internally, and may be utilized to replace any hard-coded variable. The format of the variable definition may be:
Variable (VARNAME, ProvNumber, MinValue, MaxValue, DefaultValue, Documentation), where:
VARNAME is the given name of the variable;
ProvNumber is the offset position of the variable in the port Provision Array (0-63);
MinValue is the minimum value allowed for the variable;
MaxValue is the maximum value allowed for the variable;
DefaultValue is the initial value used to set the variable until changed by Provision; and
Documentation is an informational character string displayed to the user to aid in deciding how to set up this variable.

Perhaps due to implementation constraints and/or other factors, the maximum number of variables may not exceed 32 in some embodiments. When the description is compiled, the variable may be encoded in such a way as to indicate to the GSI that it must retrieve the value from an external description. If the external reference is not defined (e.g., set to zero), then the default value may be used.

Signaling States

The signaling states are the textual names corresponding to the internal states for an SSM. The names of the states may be retrieved by the system for display purposes only. The actual state order may remain local and not be used by any external software. The user may name the states in a descriptive manner to aid debugging of the SSM, in case a sequencing error is encountered, for example. The format of the state descriptor may be as follows:
STATE (STATENAME)
STATENAME The given name of a local state.

Signaling Commands

The signaling commands are SSM commands for the signaling part of the SSM (the equipment). These commands may cause the outbound ABCD signaling bits to change, and may move the signaling machine from one telecom state into another. The actions executed by each command may be LSDF-dependent, and each LSDF may be required to define its own action. The action description format may be flexible, such as may accommodate a variety of actions yet remain simple to enable fast execution. To do this, each LSDF may define a set of XTRANSITION descriptors. Each signaling command may then be mapped to a single XTRANSITION descriptor. The format of the XTRANSITION descriptor may be as follows:

| | |
|---|---|
| XTRANSITION (CMD_NAME, FROM_STATE, TO_STATE, XSIGNAL [,EXIT_TIMER]) | |
| CMD_NAME | Value chosen from the command list. (e.g. CMD_ANSWER). |
| From_STATE | Signaling machine current state for valid command. |
| To_STATE | Signaling STATE after this command is executed |
| XSIGNAL | ABCD signaling descriptor name. |
| Exit_TIMER | Optional timeout value. In case of a timeout, a TTRANSITION may be executed. |

If the issued command cannot be mapped to a specific XTRANSITION descriptor, the SSM may be immediately placed in the ERROR state. Within this descriptor another descriptor, XSIGNAL, may be required. The XSIGNAL descriptor may be a construct that defines how to output the ABCD bits for this state machine. The format of the XSIGNAL descriptor may be as follows:

| XSIGNAL (SIG_NAME, ABCD [,PULSE_TIMER[,GUARD_TIMER]]) | |
|---|---|
| SIG_NAME | Signal name, possibly only local in scope. |
| ABCD | The ACBD signal bit channels. This field may include four characters, possibly encoded as:<br>P: Pulse this channel (0-1-0 or 1-0-1). Defining a PULSE_TIMER value may be required. Upon completion of the signaling, the ABCD code remains the same.<br>0: output "0" on this channel.<br>1: output "1" on this channel.<br>The encoding of 0101 outputs 0 on channel A and C. Channels B and D are set to "on." The encoding of (P0P1,200) flips the A and C bits from their current value for 200 ms (for example), after which they may be restored back to their original values. Meanwhile, B may output 0 and D may output 1. |
| PULSE_TIMER | This may only be required if one or more of the ABCD is defined as "P". |
| GUARD_TIMER | This is an optional timer that may be used if PULSE_TIMER is defined. This timer defines the length of time (in ms) that the outbound signaling may be required to be stable before a new command is accepted. Meanwhile, the inbound signaling may be ignored until the guard<br>timer has expired, and then the inbound signaling may be re-evaluated. |

Signaling Events

Signaling events may be received as a result of inbound ABCD bit changes. The signaling events may be asynchronous to the signaling state, and may be required to pass through one or more filters to qualify the input, such as described below.

Signal showering occurs when the ABCD signal changes faster than the state machine can reach a terminus (valid) state. This may be caused when the physical layer has a termination provisioning mismatch. The mismatch may cause a rapid change in the signal. The signaling state may be required to protect against such errors, and to place the port in the ERROR state. The FILTER parameter descriptor may be:

| FILTER (Total_transitions, Invalid_signal_Time_Duration, Time_Duration, XSIG, SHOWERINGSTATE[, INVALIDSTATE]), where: | |
|---|---|
| Total_TRANSITIONS | The number of transition in the undecided state (such as to trigger a showering error); |
| Invalid_signal_Time_Duration | The amount of time (in ms) to declare invalid signal state; |
| Time_DURATION | The amount of time (in ms) that the state machine may remain in the undecided state; |
| XSIG | The signal sent out when an error is detected; |
| SHOWERINGSTATE | The state entered when showering occurs; and |
| INVALIDSTATE | An optional state entered when an invalid state is detected. If not specified, the SHOWERINGSTATE may be used. |

The received signaling code may be the received ABCD value of the ABCD signals. The signaling machine may be required to define all valid ABCD signals. This may be done via an RSIGNAL descriptor, which may have the following descriptor format:

| RSIGNAL (EVT_NAME,ABCD,MINSIG[,MAXSIG]), where: | |
|---|---|
| EVT_NAME | The name of this signal, and which may only be local in scope; |
| ABCD | The ACBD signal bit channels, which may four characters possibly encoded as:<br>P: Pulse this channel (0-1-0 or 1-0-1), and a value for PULSE_TIMER may be required to be defined (note that, upon completing signaling, the ABCD code may remain the same);<br>0: output "0" on this channel;<br>1: output "1" on this channel;<br>X: Don't care (not checked), or maintain same state;<br>W: 0-1-0 transitions, and a value for PULSE_TIMER may be required to be defined (note that, upon completing signaling, the ABCD code may remain the same);<br>F: 1-0-1 transitions, and a value for PULSE_TIMER may be required to be defined (note that, upon completing signaling, the ABCD code may remain the same); and<br>T: 0-1 or 1-0 transition; and<br>The encoding of 0101 may look for 0 on channel A and C, and channels B and D may be required to be set, where the encoding of (P0PX,200,300) may look for a pulse on the A and C bits from their current value for a minimum of 200 ms (for example), after which they may be required to return back to their original values before 300 ms expires (for example), and B may be required to be 0 and D may be anything; |
| MINSIG | Indicates that ABCD must remain unchanged for this duration; and |
| MAXSIG | A timer which may be required to be defined if any of the ABCD bits are encoded as "P"—this timer defines the maximum size of the pulse after which this RSIGNAL no longer defines the EVT_NAME (the signal may be verified against other RSIGNALS). |

An event transition descriptor ETRANSITION may be required to transition the signaling machine to a new state, if it is required, and to issue a system event to inform the system that such event has occurred. The format may be:

| ETRANSITION (FROM_STATE, TO_STATE,<br>RSIGNAL, SYS_EVENT [,EXIT_TIMER]); where: | |
|---|---|
| FROM_STATE | The state in wish RSIGNAL is valid; |
| TO_STATE | The state which the signaling machine moves to if the event is received; |
| RSIGNAL | The receive signal descriptor name; |
| SYS_EVENT | The name of the system event(s) that has to be sent to the system, such as EVT_OFFER and EVT_METERANSWER; and |
| EXIT_TIMER | An optional timer value to exit the TO_STATE when the time expires (upon expiration of the timer, the timer transition is executed). |

Timer Transition Events

One or more signaling machines may have exceptions that may require timed action. For example, if the clear command is issued but the remote port did not acknowledge by sending a clear back, then the local port may be required take action. This action may differ from one signaling variant to another. Accordingly, the EXIT_TIMER parameter may be added to the XTRANSITION and the ETRANSITION descriptors. The format of the Timer transition TTRANSITION may be:

An event-repost descriptor EREPOST may transition the signaling machine to a new state and, possibly, apply the event to this new state. If the new state does not handle this event, then an exception may be generated. The format of the EREPOST may be:

| EREPOST (FROM_STATE, TO_STATE, RSIGNAL); where: | |
|---|---|
| FROM_STATE | The state in wish RSIGNAL is valid; |
| TO_STATE | The state which the signaling machine moves to if the event is received; and |
| RSIGNAL | The receive signal descriptor name. |

| TTRANSITION (FROM_STATE, TO_STATE, SYS_EVENT [,XSIGNAL]); where: | |
|---|---|
| FROM_STATE | The state in which the timer expired in, and may be required to match one of the<br>TO_STATE where the EXIT_TIMER parameter is defined "in"; |
| TO_STATE | The state which the signaling machine moves to if the timer expired; |
| SYS_EVENT | The name of the system event(s) that may be required to be sent to the system, such as EVT_ERROR; and |
| XSIGNAL | The optional ABCD signaling descriptor name to send out before entering the TO_STATE, and if this parameter is not defined, then the state is entered without any outbound signaling change. |

With the above descriptor, the signaling machine may be defined for many different types of line signaling. If a new state or event is needed, then the system may add these new events and states to its generic signaling process as an upgrade. Simply changing the description may cause the system to change line signaling timing and behavior.

Figure 4:
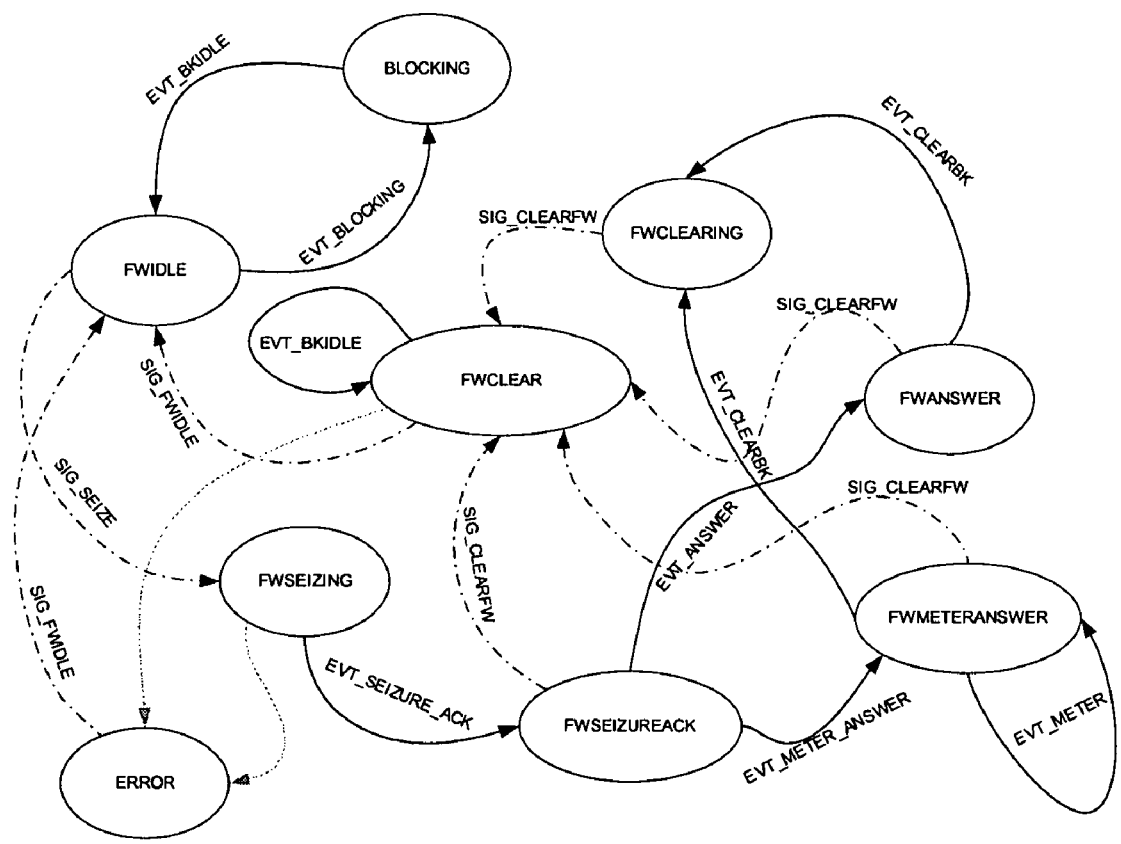
FIG. 4 is a schematic view of at least a portion of an embodiment of a signaling state diagram for an F6 signaling schema according to aspects of the present disclosure.
Figure 5:
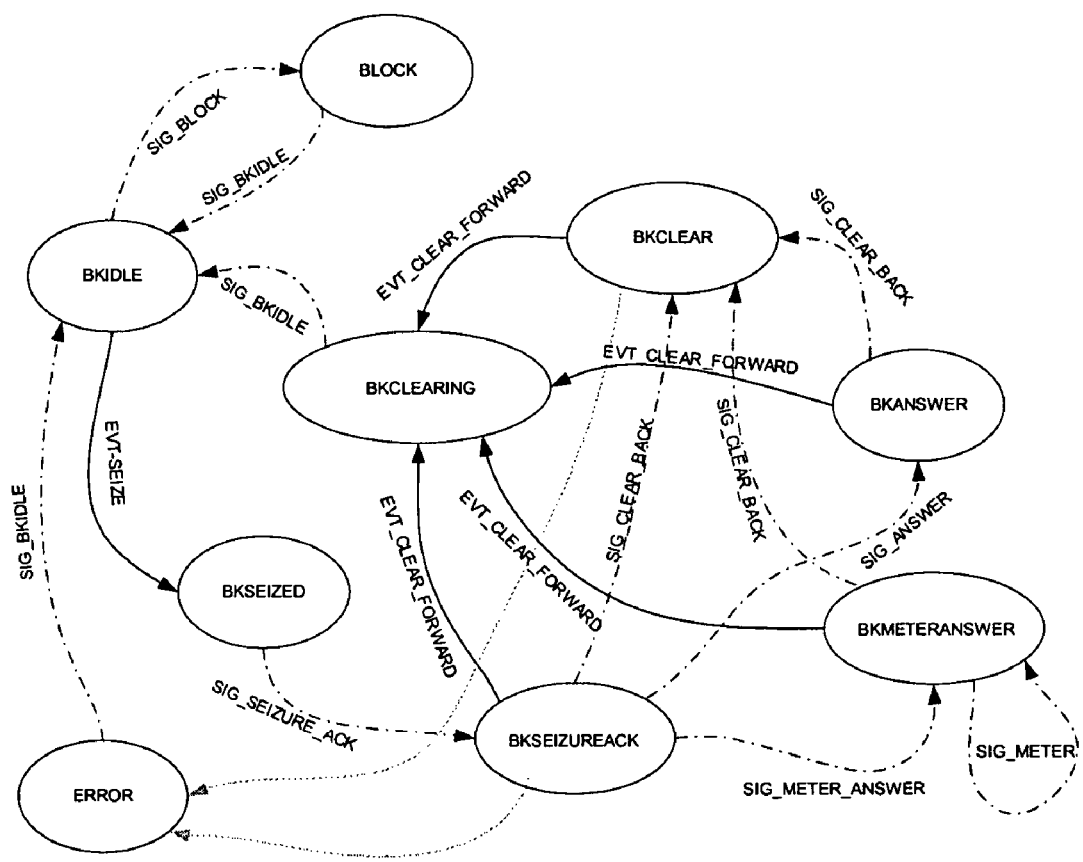
FIG. 5 is a schematic view of at least a portion of an embodiment of another signaling state diagram for an F6 signaling schema according to aspects of the present disclosure.
Figure 6:
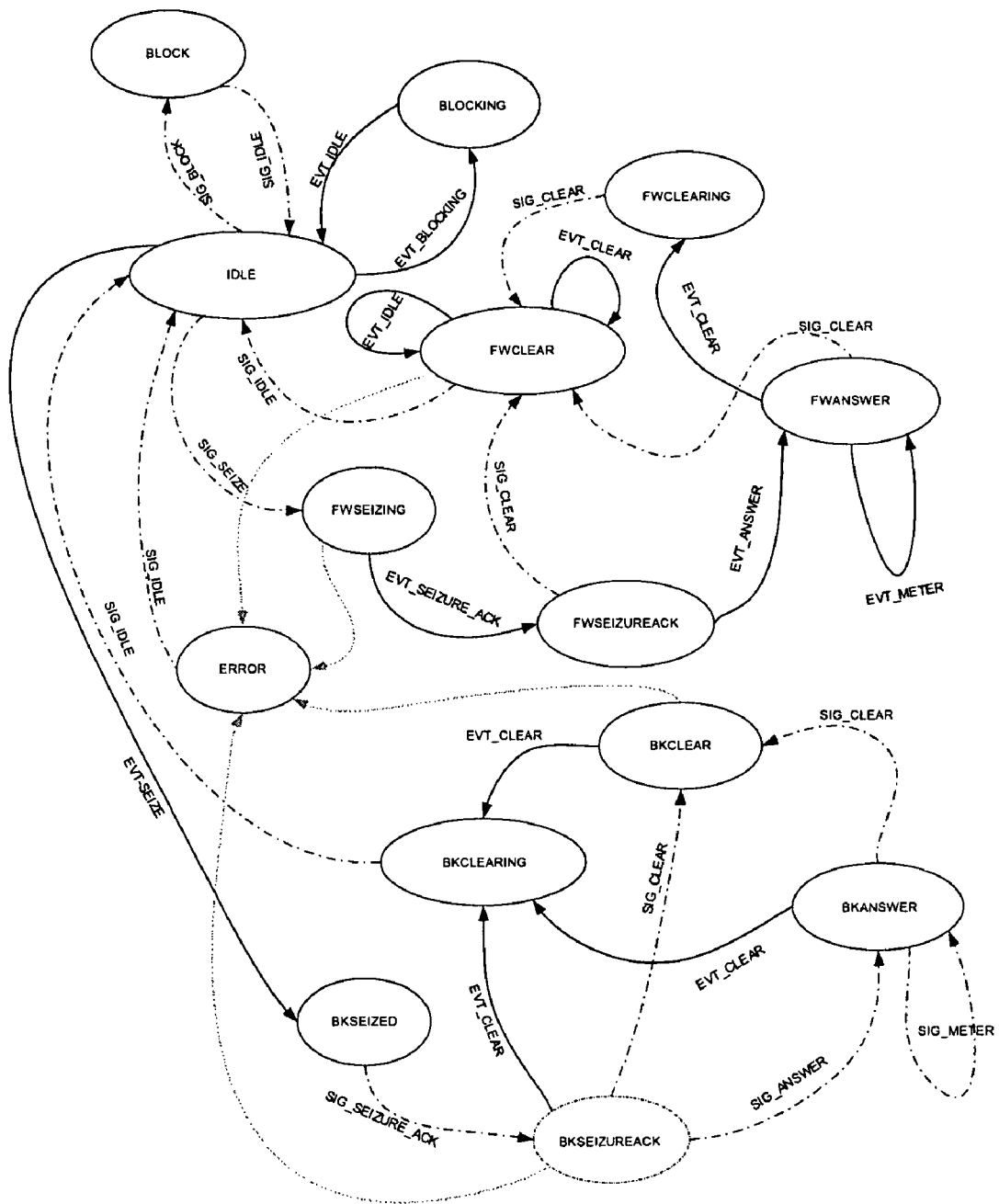
FIG. 6 is a schematic view of at least a portion of an embodiment of an Indonesian E&M single bit signaling schema according to aspects of the present disclosure.

What follows is the description of several common signaling schemas as examples of the above-described approach. Note that the XTRANSITION and ETRANSITION may be derived from the signaling state diagram. They may be the definition of a directional link between two states on such diagram (see, for example, FIGS. 4-6). In FIGS. 4-6, for which the corresponding discussion follows, the dashed-line links indicate a transition caused by a system command (XTRANSITION), the solid-line transitions are the result of detectable events (ETRANSITIONS), and the dotted-line transitions are the result of timeout events. Not shown are the filter actions, which may move the machine from any state into the error state.

Note also that the following description merely provides examples of tables which may be entered for some embodiments of signaling implementation within the scope of the present disclosure. However, other tables/embodiments are also within the scope of the present disclosure.

Referring to FIGS. 4 and 5, collectively, illustrated are at least portions of embodiments of signaling state diagrams for an F6 signaling schema according to aspects of the present disclosure. F6 signaling is an asymmetric signaling schema requiring two separate state machines: one for the originating port (FIG. 4) and another for the terminating side (FIG. 5).

The following is a description of the exemplary state diagram corresponding to the originating port in an F6 signaling schema, as shown in FIG. 4.
F6 Forward signaling machine.
ERROR conditions
This variable defines the maximum SIGNALING transitions allowed before a valid
EVENT is reached. Also set the max time allowed for an unknown event before
declaring ERROR STATE.
NAME (F6_FWSIGNALING_MACHINE)

| | |
|---|---|
| STATE ( ERROR ) | ## error detected |
| STATE ( IDLEWAIT ) | ## wait for the idle signal |
| STATE ( IDLE ) | ## Idle state waiting for seizure command |
| STATE ( SEIZING ) | ## sending seize signal and waiting for ACK |
| STATE ( SEIZUREACK ) | ## received seizure ACK signal |
| STATE ( ANSWER ) | ## Received answer signal event |
| STATE ( METERANSWER ) | ## Received meter answer event |
| STATE ( ANSWERACK ) | ## Go to the talk state |
| STATE ( METERANSWERACK ) | ## Go to the talk state with meter detection |
| STATE ( CLEARFORWARD ) | ## Clear forward received |
| STATE ( CLEARBACK ) | ## clear back event is received |

STATE (BLOCKING) ## BLOCKING event is received.
Define Forward SIGNALS
XSIGNAL (SIG_FWIDLE, 1111)
XSIGNAL (SIG_SEIZURE, 0111)
XSIGNAL (SIG_CLEARFW, 1111)
FILTERS (10,2500, SIG_FWIDLE,ERRor)
Backward signal Events,
RSIGNAL (EVT_BKIDLE, 0111, 20)
RSIGNAL (EVT_SEIZE_ACK, 1111, 20)
RSIGNAL (EVT_ANSWER, 1001, 20)
RSIGNAL (EVT_METER_ANSWER, 11P1, 120, 250)
RSIGNAL (EVT_METER, 11P1, 120, 250)
RSIGNAL (EVT_CLEAR_BACK, 1101, 20)
RSIGNAL (EVT_BLOCKING, 1111, 250)
STATE TRANSITION CAUSED BY SIGNALING MACHINE
XTRANSITION (CMD_IDLE, ERROR, FWIDLE, SIG_FWIDLE)
XTRANSITION (CMD_IDLE, FWCLEAR, FWIDLE, SIG_ FWIDLE)
XTRANSITION (CMD_SEIZE, FWIDLE, FWSEIZING, SIG_SEIZURE, 5000)
XTRANSITION (CMD_CLEAR, FWSEIZUREACK, FWCLEAR, SIG_CLEARFW, 3500)
XTRANSITION (CMD_CLEAR, FWANSWER, FWCLEAR, SIG_CLEARFW, 3500)
XTRANSITION (CMD_CLEAR, FWMETERANSWERE, FWCLEAR, SIG_CLEARFW, 3500)
XTRANSITION (CMD_CLEAR, FWCLEARING, FWCLEAR, SIG_CLEARFW, 3500)
STATE TRANSITIONS CAUSED BY RECEIVED EVENT CHANGES
ETRANSITION (FWSEIZING, FWSEIZUREACK, EVT_SEIZE_ACK, SYS_SEIZUREACK)
ETRANSITION (FWSEIZUREACK, FWANSWER, EVT_ANSWER, SYS_ANSWER)
ETRANSITION (FWSEIZUREACK, FWMETERANSWER, EVT_METER_ANSWER, SYS_METERANSWER)
ETRANSITION (FWANSWER, FWCLEARING, EVT_CLEAR_BACK, SYS_CLEAR)
ETRANSITION (FWMETERANSWER, FWCLEARING, EVT_CLEAR_BACK, SYS_CLEAR)
ETRANSITION (FWMETERANSWER, FWMETERANSWER, EVT_METER, SYS_METER)
ETRANSITION (FWCLEAR, FWCLEAR, EVT_BKIDLE, SYS_BKIDLE)
ETRANSITION (FWIDLE, BLOCKING, EVT_BLOCKING, SYS_BLOCK)
ETRANSITION (BLOCKING, FWIDLE, EVT_BKIDLE, SYS_IDLE)
STATE TRANSITIONS CAUSED BY TIMER EXPIRY EVENT
TTRANSITION (FWCLEAR, ERROR, SYS_ERROR)
TTRANSITION (FWSEIZING, ERROR, SYS_ERROR)

The following is a description of the exemplary state diagram corresponding to the terminating side of the F6 signaling schema, as shown in FIG. 5.
FILTER conditions
NAME (F6_BKSIGNALING_MACHINE)
FILTER (10,2500)
Define Backward SIGNALS
XSIGNAL (SIG_BKIDLE, 0111)
XSIGNAL (SIG_SEIZURE_ACK, 1111)
XSIGNAL (SIG_CLEARBK, 1101)
XSIGNAL (SIG_ANSWER, 1001)
XSIGNAL (SIG_METERANSWER, 11P1, 150)
XSIGNAL (SIG_METER, 11P1, 150)
XSIGNAL (SIG_BLOCK, 1111)
Forward signal Events,
RSIGNAL (EVT_FWIDLE, 1111, 20)
RSIGNAL (EVT_SEIZURE, 0111, 50)
RSIGNAL (EVT_CLEARFW, 1111, 20)
STATE TRANSITION CAUSED BY SIGNALING MACHINE
XTRANSITION (CMD_IDLE, ERROR, BKIDLE, SIG_BKIDLE)

XTRANSITION (CMD_IDLE, BLOCK, BKIDLE, SIG_BKIDLE)
XTRANSITION (CMD_IDLE, BKCLEARING, BKIDLE, SIG_BKIDLE)
XTRANSITION (CMD_BLOCK, BKIDLE, BLOCK, SIG_BLOCK)
XTRANSITION (CMD_SEIZUREACK, BKSEIZED, BKSEIZUREACK, SIG_SEIZURE_ACK, 25000)
XTRANSITION (CMD_ANSWER, BKSEIZUREACK, BKANSWER, SIG_ANSWER)
XTRANSITION (CMD_METERANSWER, BKSEIZUREACK, BKMETERANSWER, SIG_METERANSWER)
XTRANSITION (CMD_CLEAR, BKSEIZUREACK, BKCLEAR, SIG_CLEARBK, 5000)
XTRANSITION (CMD_CLEAR, BKANSWER, BKCLEAR, SIG_CLEARBK, 5000)
XTRANSITION (CMD_CLEAR, BKMETERANSWER, BKCLEAR, SIG_CLEARBK, 5000)
XTRANSITION (CMD_METER, BKMETERANSWER, BKMETERANSWER, SIG_METER)
STATE TRANSITIONS CAUSED BY RECIVED SIGNALING EVENTS
ETRANSITION (BKIDLE, BKSEIZED, EVT_SEIZURE, SYS_SEIZURE)
ETRANSITION (BKSEIZUREACK, BKCLEARING, EVT_CLEARFW, SYS_CLEAR)
ETRANSITION (BKANSWER, BKCLEARING, EVT_CLEARFW, SYS_CLEAR)
ETRANSITION (BKMETERANSWER, BKCLEARING, EVT_CLEARFW, SYS_CLEAR)
ETRANSITION (BKCLEAR, BKCLEARING, EVT_CLEARFW, SYS_CLEAR)
STATE TRANSITIONS CAUSED BY TIMER EXPIRY EVENT
TTRANSITION (BKCLEAR, ERROR, SYS_ERROR)
TTRANSITION (BKSEIZUREACK, ERROR, SYS_ERROR)

Another possible encoding schema is the Indonesian E&M single bit signaling, an exemplary embodiment of which is depicted by the signaling state diagram shown in FIG. 6. This is a bi-directional signaling machine that uses only the A bit to define all the line signaling transitions. The following is a description of an example of such signaling system.
ERROR conditions
NAME (EnM_SingleBit_Machine)
FILTER (10, 2500)
Define Common SIGNALS
XSIGNAL (SIGNAL_NAME, ABCD_VALUE[PULSE_DURATION[,REQUIRED_GAP]])
XSIGNAL (SIG_BLOCK,0001)
XSIGNAL (SIG_IDLE,1001)
XSIGNAL (SIG_CLEAR,P001,600,300)
Define Forward SIGNALS
XSIGNAL (SIG_SEIZURE,P001,150,300)
Define Backward SIGNALS
XSIGNAL (SIG_SEIZURE_ACK,P001,600,300)
XSIGNAL (SIG_ANSWER,P001,150,300)
XSIGNAL (SIG_METER,11P1,150,300)
EVENTS
Bi-DIRECTIONAL signal Events,
RSIGNAL (EVT_IDLE,10XX,1000)
RSIGNAL (EVT_CLEAR,P0XX,480,720,250)
RSIGNAL (EVT_BLOCKED,0XXX,1000)
Forward Signal
RSIGNAL (EVT_SEIZURE,P0XX,120,180,250)
Backward signal Events,
RSIGNAL (EVT_SEIZE_ACK, P0XX,480,720,250)
RSIGNAL (EVT_ANSWER, P0XX,120,180,250)
RSIGNAL (EVT_METER, P0XX,120,180,250)
STATE TRANSITION (dashed lines in FIG. 6)
Blocking, and common states
XTRANSITION (CMD_IDLE, ERROR, IDLE, SIG_IDLE)
XTRANSITION (CMD_IDLE, BLOCK, IDLE, SIG_IDLE)
XTRANSITION (CMD_BLOCK, IDLE, BLOCK, SIG_BLOCK)
FW call setup
XTRANSITION (CMD_SEIZE, IDLE, FWSEIZING, SIG_SEIZURE, 5000)
XTRANSITION (CMD_IDLE, FWCLEAR, IDLE, SIG_IDLE)
XTRANSITION (CMD_CLEAR, FWSEIZUREACK, FWCLEAR, SIG_CLEAR, 3500)
XTRANSITION (CMD_CLEAR, FWANSWER, FWCLEAR, SIG_CLEAR, 3500)
XTRANSITION (CMD_CLEAR, FWCLEARING, FWCLEAR, SIG_CLEAR, 3500)
BK call setup
XTRANSITION (CMD_SEIZUREACK, BKSEIZED, BKSEIZUREACK, SIG_SEIZURE_ACK, 25000)
XTRANSITION (CMD_ANSWER, BKSEIZUREACK, BKANSWER, SIG_ANSWER)
XTRANSITION (CMD_METERANSWER, BKSEIZUREACK, BKANSWER, SIG_ANSWER)
XTRANSITION (CMD_CLEAR, BKSEIZUREACK, BKCLEAR, SIG_CLEAR, 5000)
XTRANSITION (CMD_CLEAR, BKANSWER, BKCLEAR, SIG_CLEAR, 5000)
XTRANSITION (CMD_METER, BKANSWER, BKANSWER, SIG_METER)
XTRANSITION (CMD_IDLE, BKCLEARING, IDLE, SIG_IDLE)
EVENTS (solid lines in FIG. 6)
STATE TRANSITIONS CAUSED BY RECIVED SIGNALING EVENTS
ETRANSITION (IDLE, BLOCKING, EVT_BLOCKED, SYS_BLOCK)
ETRANSITION (BLOCKING, IDLE, EVT_IDLE, SYS_IDLE)
EVENTS FW call
ETRANSITION (FWSEIZING, FWSEIZUREACK, EVT_SEIZE_ACK, SYS_SEIZUREACK)
ETRANSITION (FWSEIZUREACK, FWANSWER, EVT_ANSWER, SYS_ANSWER)
ETRANSITION (FWANSWER, FWANSWER, EVT_METER, SYS_METER)
ETRANSITION (FWANSWER, FWCLEARING, EVT_CLEAR, SYS_CLEAR)
ETRANSITION (FWCLEAR, FWCLEAR, EVT_IDLE, SYS_IDLE)
ETRANSITION (FWCLEAR, FWCLEAR, EVT_CLEAR, SYS_CLEAR)
EVENTS BK call
ETRANSITION (IDLE, BKSEIZED, EVT_SEIZURE, SYS_SEIZURE)
ETRANSITION (BKSEIZUREACK, BKCLEARING, EVT_CLEAR, SYS_CLEAR)
ETRANSITION (BKANSWER, BKCLEARING, EVT_CLEAR, SYS_CLEAR)
ETRANSITION (BKANSWER, BKCLEAR, EVT_CLEAR, SYS_CLEAR)
ETRANSITION (BKCLEAR, BKCLEARING, EVT_CLEAR, SYS_CLEAR)
TIMER (dotted lines in FIG. 6)

STATE TRANSITIONS CAUSED BY TIMER EXPIRY EVENT
TTRANSITION (BKCLEAR, ERROR, SYS_ERROR)
TTRANSITION (BKSEIZUREACK, ERROR, SYS_ERROR)
TTRANSITION (FWCLEAR, ERROR, SYS_ERROR)
TTRANSITION (FWSEIZING, ERROR, SYS_ERROR)

Figure 7:
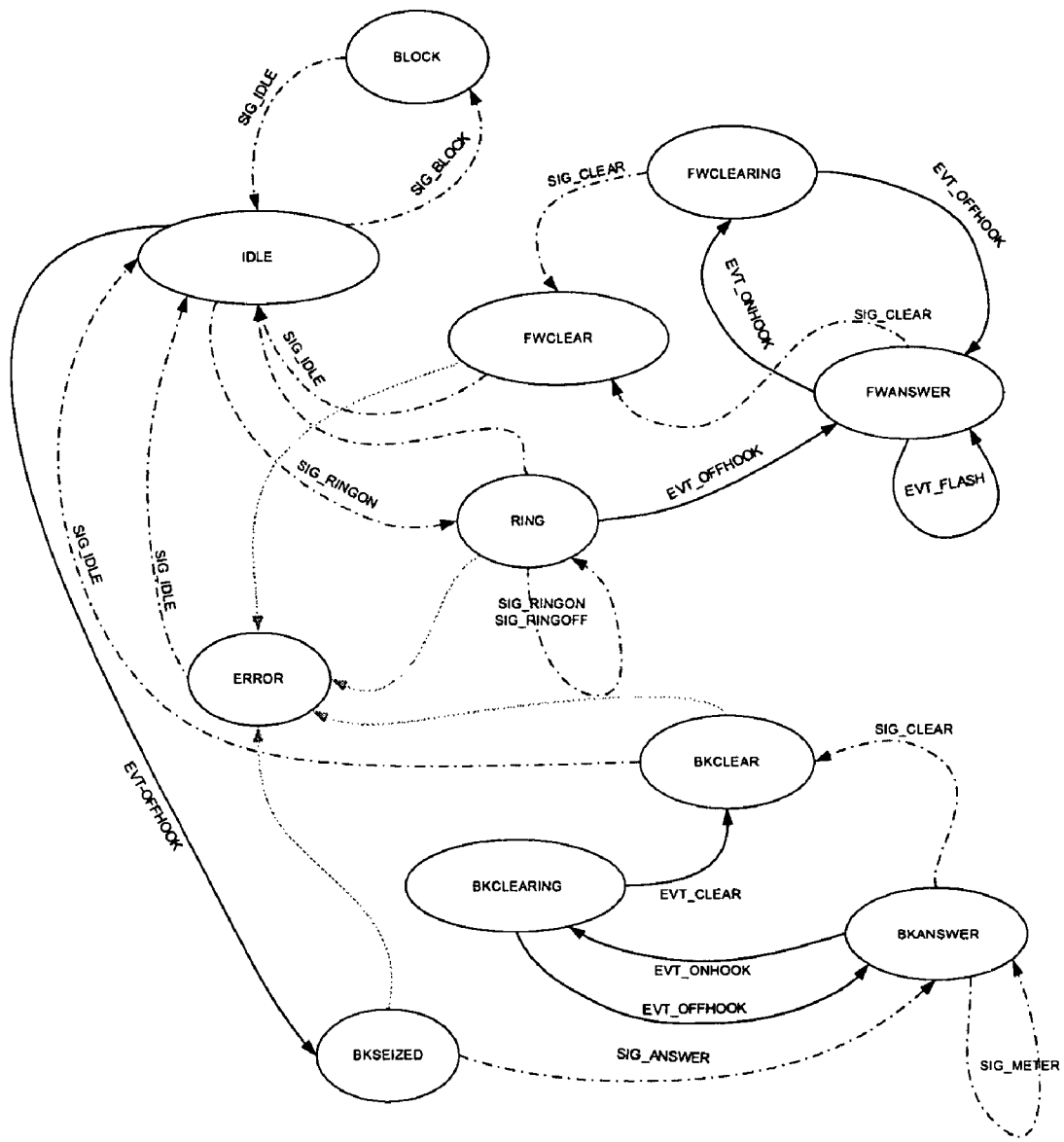
FIG. 7 is a schematic view of at least a portion of a network side of a generic LOOP-START signaling schema according to aspects of the present disclosure.

The following description regards the network side of a generic LOOP-START signaling schema using the AB bits only, such as that depicted by the signaling state diagram shown in FIG. 7.
FILTER conditions
NAME (LoopStart_Machine)
FILTER (10,2500)
Define Backward SIGNALS
XSIGNAL (SIG_IDLE, 0101)
XSIGNAL (SIG G_RINGON, 0000)
XSIGNAL (SIG_RINGOFF, 0101)
XSIGNAL (SIG_ANSWER, 0100)
XSIGNAL (SIG_BLOCK, 1111)
XSIGNAL (SIG_CLEAR, PPPP, 900, 300)
XSIGNAL (SIG_METER, P1--, 150)
Forward signal Events,
RSIGNAL (EVT_ONHOOK, 00XX, 20)
RSIGNAL (EVT_OFFHOOK, 11XX, 50)
RSIGNAL (EVT_FLASH, PPXX, 350, 800)
RSIGNAL (EVT_METER, P1XX, 120, 180)
STATE TRANSITION CAUSED BY SIGNALING MACHINE
outgoing call to LS port with RLFC
XTRANSITION (CMD_IDLE, ERROR, IDLE, SIG_IDLE)
XTRANSITION (CMD_IDLE, BLOCK, IDLE, SIG_IDLE)
XTRANSITION (CMD_BLOCK, IDLE, BLOCK, SIG_BLOCK)
XTRANSITION (CMD_SEIZURE, IDLE, RING, SIG_RINGON)
XTRANSITION (CMD_RINGON, RING, RING, SIG_RINGON, 300000)
XTRANSITION (CMD_RINGOFF, RING, RING, SIG_RINGOFF)
XTRANSITION (CMD_ANSWER, RING, FWANSWER, SIG_ANSWER)
XTRANSITION (CMD_IDLE, FWCLEAR, IDLE, SIG_IDLE)
XTRANSITION (CMD_CLEAR, FWSEIZUREACK, FWCLEAR, SIG_CLEAR, 3500)
XTRANSITION (CMD_CLEAR, FWANSWER, FWCLEAR, SIG_CLEAR, 3500)
XTRANSITION (CMD_CLEAR, FWCLEARING, FWCLEAR, SIG_IDLE)
XTRANSITION (CMD_CLEAR, RING, IDLE, SIG_IDLE)
Incoming call setup
XTRANSITION (CMD_SEIZUREACK, BKSEIZED, BKSEIZUREACK, SIG_IDLE, 25000)
XTRANSITION (CMD_ANSWER, BKSEIZUREACK, BKANSWER, SIG_ANSWER)
XTRANSITION (CMD_METERANSWER, BKSEIZUREACK, BKANSWER, SIG_ANSWER)
XTRANSITION (CMD_CLEAR, BKSEIZUREACK, BKCLEAR, SIG_CLEAR, 5000)
XTRANSITION (CMD_CLEAR, BKANSWER, BKCLEAR, SIG_CLEAR, 5000)
XTRANSITION (CMD_METER, BKANSWER, BKANSWER, SIG_METER)
XTRANSITION (CMD_IDLE, BKCLEARING, IDLE, SIG_IDLE)
EVENTS (solid lines shown in FIG. 7)
EVENTS FW call
ETRANSITION (RING, FWANSWER, EVT_OFFHOOK, SYS_ANSWER)
ETRANSITION (FWANSWER, FWANSWER, EVT_FLASH, SYS_FLASH)
ETRANSITION (FWANSWER, FWCLEARING, EVT_ONHOOK, SYS_CLEAR)
ETRANSITION (FWCLEARING, FWANSWER, EVT_ONHOOK, SYS_ANSWER)
ETRANSITION (FWCLEAR, IDLE, EVT_ONHOOK, SYS_IDLE)
EVENTS BK call
ETRANSITION (IDLE, BKSEIZED, EVT_OFFHOOK, SYS_SEIZURE)
ETRANSITION (BKSEIZUREACK, BKCLEARING, EVT_ONHOOK, SYS_CLEAR)
ETRANSITION (BKANSWER, BKCLEARING, EVT_ONHOOK, SYS_CLEAR)
ETRANSITION (BKCLEARING, BKANSWER, EVT_OFFHOOK, SYS_ANSWER)
ETRANSITION (BKANSWER, BKANSWER, EVT_FLASH, SYS_FLASH)
ETRANSITION (BKMETERANSWER, BKMETERANSWER, EVT_METER, SYS_METER)
TIMER (dotted lines in FIG. 7)
STATE TRANSITIONS CAUSED BY TIMER EXPIRY EVENT
TTRANSITION (FWCLEAR, ERROR, SYS_ERROR)
TTRANSITION (BKCLEAR, ERROR, SYS_ERROR)
TTRANSITION (BKSEIZUREACK, ERROR, SYS_ERROR)
TTRANSITION (RING, ERROR, SYS_ERROR)

Line Signaling Descriptors File (LSDF)

Once the SSM description has been defined, the description may be fed into an OFFLINE compiler to check the integrity and cohesion of the data entered. A binary image of the signaling machine may be generated and/or saved in file (LSDF). The file may then be downloaded to memory by GSI application for execution. As with the examples described above, the implementation depicted in FIG. 8 in flow-chart form is merely an example, and may be implemented differently for other systems. Also, the implementation described below may require some ordering and specific data packing, which may be mainly for optimization and execution speed and/or have no bearing on the applicability of described method.

The binary data of the LSDF generated by the compiler may be a linear memory that contains a memory header followed by the signaling specific data. The following is one example of the format of the file header:
Signaling File Header (128 bytes)
  4 bytes: Check sum of the file not including these 4 bytes
  4 bytes: File size in bytes
  4 bytes: Number of constructs in this file
  4 bytes: unassigned=0
Signaling constructs may follow the file header structure. Each construct may have a construct header of fixed length followed by a variable number of data bytes containing the actual data of the construct. This variable data length may be construct-specific, and each may be listed separately. An example is:
Signaling Construct Header (16 bytes)
  4 bytes: Construct check sum not including these 4 bytes
  2 bytes: Construct data field size (not including the size of this header)

2 bytes: Version control
2 bytes: Construct type
6 bytes: spare=0
The following are examples of different constructs, specified by type.
NAME Construct Data
  128 bytes: Signaling machine name
FILTER Construct Data
  2 bytes: undecided state signal transition to failure
  2 bytes: spare=0
  4 bytes: Invalid signal timer in the undecided state before error
  4 bytes: maximum time in the undecided state before error
  4 bytes: maximum time in the undecided state before error
  4 bytes: maximum time in the undecided state before error
XSIGNAL Construct Data
  1 byte: Signal Number
  1 byte: A channel Signal definition
  1 byte: B channel Signal definition
  1 byte: C channel Signal definition
  1 byte: D channel Signal definition
  1 byte: spare=0
  2 byte: Pulse Duration in ms
  2 byte: Guard Time in ms
  4 bytes: valid state bit mask
RSIGNAL Construct Data
  1 byte: Event Number
  1 byte: A channel Signal definition
  1 byte: B channel Signal definition
  1 byte: C channel Signal definition
  1 byte: D channel Signal definition
  1 byte: spare=0
  2 bytes: minimum duration of the stable signal in ms
  2 bytes: maximum duration of a valid pulse signal in ms
  4 bytes: valid state bit mask
XTRANSITION Construct Data
  1 byte: Transition number
  1 byte: from state number
  1 byte: to state number
  1 byte: XSIGNAL number
  2 bytes: system command number
  2 bytes: spare=0
  4 bytes: exit timer value
ETRANSITION Construct Data
  1 byte: Transition number
  1 byte: from state number
  1 byte: to state number
  1 byte: RSIGNAL number
  2 bytes: system event to Issue
  2 bytes: spare=0
  4 bytes: exit timer value
TTRANSITION Construct Data
  1 byte: Transition number
  1 byte: from state number
  1 byte: to state number
  2 bytes: system event to Issue
  2 bytes: spare=0

The compiler may be required to arrange the RSIGNALS that belong to the common state according to specified PULSE duration in their ABCD field, possibly in the order of shortest to longest.

When the GSI loads the LSDF, additional tables may be built to speed event detection operations. For example, STATE TABLE may be an array of state descriptor structures indexed by the SSM state. Each state structure may contain: the state number; an array containing the RSIGNAL numbers supported by this state; an array containing the system commands numbers supported by this state; an array containing the XTRANSITIONS descriptor numbers; an array containing the ETRANSITION descriptor numbers; and an array containing the TTRANSITION descriptor numbers.

GSI Implementation

The system may initialize the GSI and then inform the GSI about all of the LSDFs available in the system library. The system may then proceed by requesting the GSI to bind each provisioned DS0 to a specific LSDF. Once the DS0 binding is complete, the GSI may inform the system that the DS0 are now available. The system may be required to forward all inbound raw line signaling events to the GSI. The GSI may inform the system about all out bound signaling event changes, which the system may forward to the corresponding hardware.

To accomplish the tasks requested from the GSI, the GSI may have several sub-components, such as for LSDF loading, inbound signaling processing, timer event processor, and system command processor. Each subsystem is discussed below. Additionally, the GSI may save a list of variables per bound DS0. These variables may be consulted every time a new DS0 event or command is received. The following is a list of examples of the variables that may be kept per DS0 binding.

| Signaling Internals | | |
|---|---|---|
| ulong | mActiveStandby:1; | // active standby mode.. |
| ulong | mForceSignalingUpdate:1; | |
| ulong | mState:6; | // current state |
| ulong | mSpare:24; | // unused for now |
| ulong | mSignalTransitions:8; | |
| ulong | mAllowedOffset:6; | |
| ulong | mAllowedSuboffset:6; | |
| ulong | mInboundSignalingState:4; | |
| ulong | mQueuedABCD:4; | // last known signal |
| ulong | mLastABCD:4; | // last known signal processed |
| ulong | mBaseStateSignal:4; | |
| ulong | mOutboundSignalingState:4; | |
| ulong | mXSigInprogress:4; | // Current State |
| ulong | mABCD:4; | // last known outbound signal |
| ulong | mTimerCycle:8; | // number of timer events.. |
| ulong | mOldEvt:8; | // last event issued |
| ulong | mStateTimerValue; | // save area for the last timer |
| TimerObject | mInboundSignalingTimer; | // signaling qualfication timer |
| TimerObject | mOutboundSignalingTimer; | // signaling qualfication timer |
| TimerObject | mStateTimer; | // state change timers |

| Signaling Internals | | |
|---|---|---|
| SignalingMapStatus | *mStatusPtr; | // pointer back to LSDF's slot status |
| MsfSignalingMap | *mNextUser; | // links to all active users of this |
| MsfSignalingMap | *mPrevUser; | // signaling map . . . |
| SigCallbackFun | mCBFuncPtr; | // callback function pointer |
| VisibleObject | *mClientObj; | |
| ulong | (*mUsrVar)[32]; | // user variable array. |

LSDF Loading

The GSI may loads the required LSDF file into memory, if not already loaded, when the DS0 is bound to a specific LSDF. Since the binding may occur well before the LSDF is available for access, the GSI may inform the client DS0 (through an event) that the LSDF is not available. The GSI maintains a link list of all the DS0 bound to each LSDF. When the LSDF is loaded the GSI informs all the LSDF linked DS0s that the LSDF is now enabled. For upgrade reasons, among others, the system may request a shutdown on a specific LSDF, in response to which the GSI may inform all LSDF-linked DS0s to stop using the current binding and request new ones (the system may have alternatively provided an alternate LSDF for the DS0s to use). The DS0s that are currently connected may continue use of the current LSDF until they reach IDLE state, for example, at which time they may be requested to change access to a new LSDF.

Inbound Signaling Processor

Figure 8:
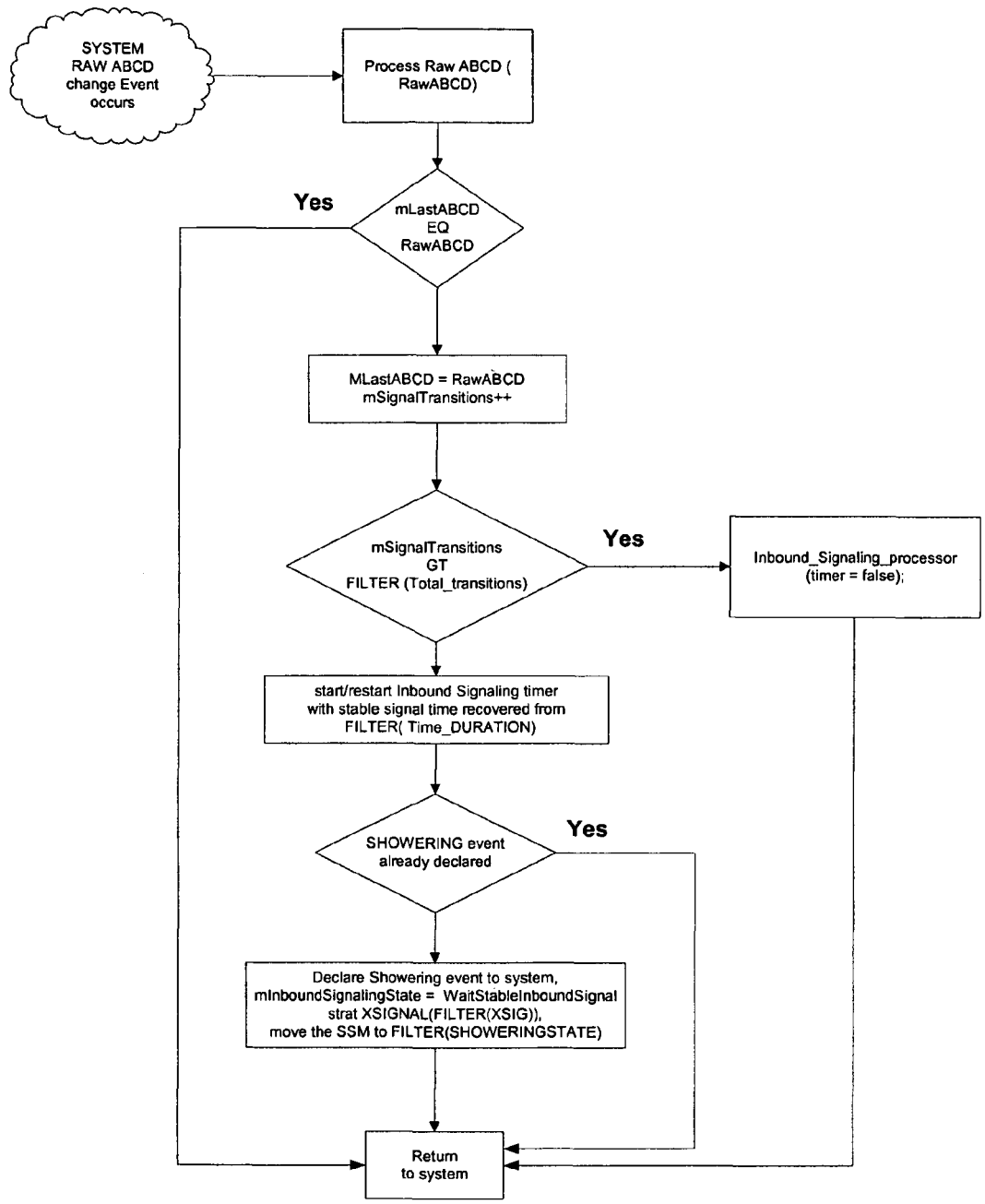
FIG. 8 is a flow-chart diagram of at least a portion of an implementation of aspects of the present disclosure.

The inbound signaling processor may receive raw signaling data (ABCD bits) from the system via its Inbound Raw Signaling input routine (see, for example, FIG. 8). The GSI may compare the newly received raw ABCD signals to the current signaling (mLastABCD). If the two values match, then the input may be ignored. However, if they are not the same, then the signaling change counter (mSignalTransitions) may be incremented, and the incremented count may be compared to the data in the FILTER construct. If the mSignalTransitions is greater than the limit specified by the FILTER construct, the SSM may be placed in the showering state defined by the FILTER construct, the outbound signaling may be changed as specified by the FILTER construct, and a SHOWERING event may be sent to the system. The system may be configured to remove the DS0 from service at this point, and possibly to wait for the GSI to report the ENDOF-SHOWERING event.

Figure 9:
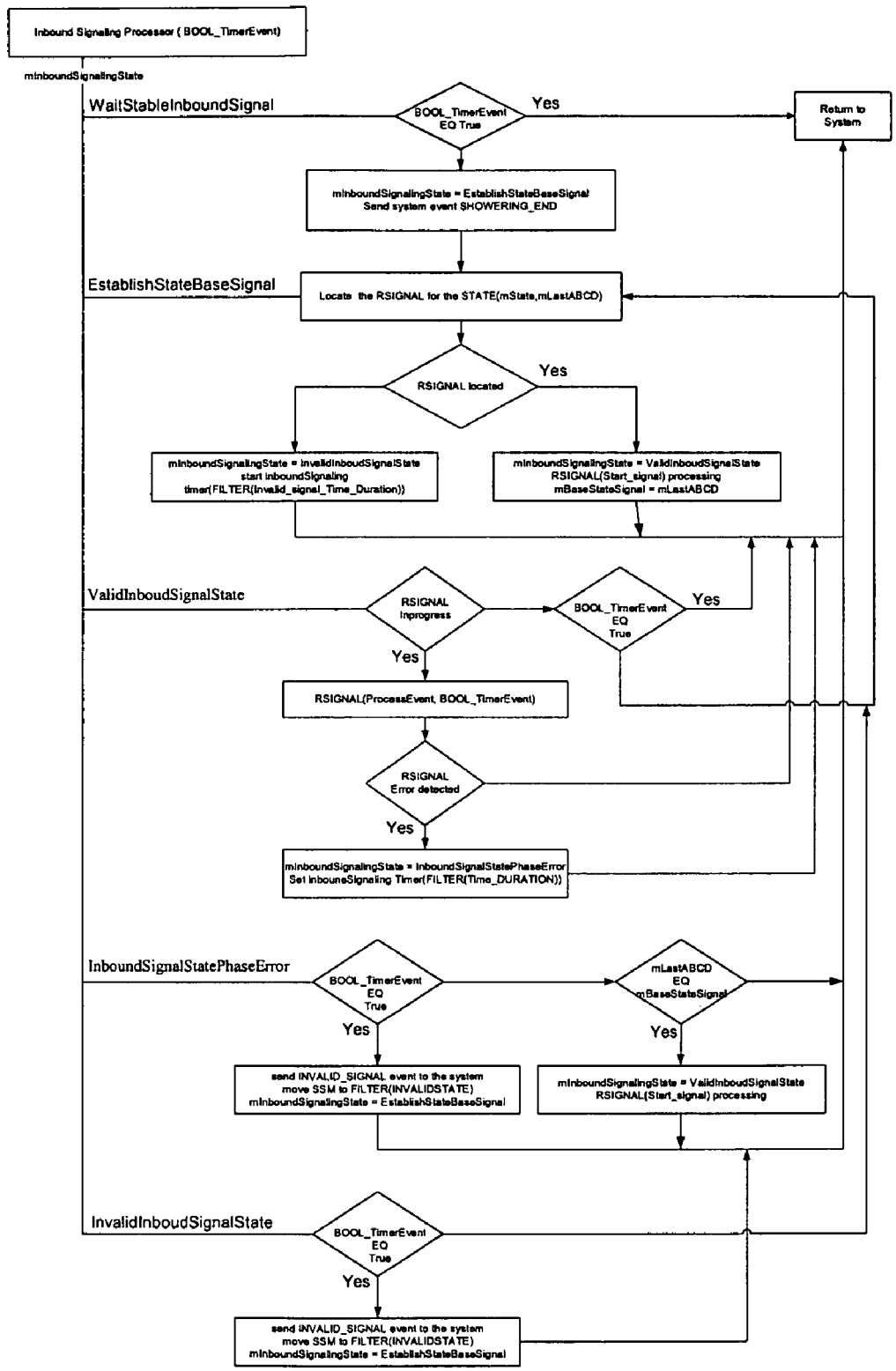
FIG. 9 is a flow-chart diagram of at least a portion of an implementation of aspects of the present disclosure.

If the mSignalTransitions is within the limits, the received signal may be saved in the mLastABCD. The signal may then be passed to the input signaling state processor (see, for example, the implementation depicted in flow-chart form in FIG. 9). The processor state may be saved in the mInboundSignalingState. The action taken by signaling state processor may depend on its current state, such as:

| | |
|---|---|
| WaitStableInboundSignal | The inbound signal may be ignored until the inbound signaling timer (mInboundSignalingTimer) has expired. Then the inbound signaling processing state may be immediately moved to EstablishStateBaseSignal. |
| EstablishStateBaseSignal | In this state, the signal may be checked against the accepted base signal for the current state. For example, IDLE state may specify a base ABCD signal in one of its RSIGNAL descriptors. The remaining IDLE state RSIGNAL constructs may define an acceptable transition from the base ABCD. If ABCD signaling bits match the ABCD bits sequencing defined in the base RSIGNAL, then the ABCD bits are accepted and the state is moved to ValidInboudSignalState. The GSI may then send, to the system, the event SYS_VALIDSIGNALESTABLISHED. |
| InvalidInboudSignalState | In this state, the inbound signal may not be valid, and the user may want to determine if this signal is temporary or steady. If we entered this state because of a timeout, then the invalid signal may have persisted for a long time. In such case, the inbound signaling processing state may be moved back to the EstablishStateBaseSignal, and an event SYS_INVALIDSIGNAL event may be sent to the system. The SSM may be moved to the state specified by the FILTER construct. If this state was entered because of a signaling change, then the signal may be re-evaluated in the same manner as with the EstablishStateBaseSignal. |
| ValidInboudSignalState | In this state, the SSM may be in a valid state, and may be expecting signals that transition it according to one of the defined RSIGNALS, for example. If currently in the middle of an RSIGNAL processing, then the ABCD signaling may be passed to the RSIGNAL processor. If the processor has achieved a terminal event, then the mSignalTransitions may be resent, and the event specified by the RSIGNAL may be sent to the system. Depending on the defined ETRANSITION, the SSM may be moved to the specified state. Also, if the ETRANSITION construct defines any timing action, then the state timer (mStateTimer) may be started, possibly with a value recovered from the ETRANSITION. If the RSIGNAL returns phase error (indicating that the signaling started OK but the final signal received is not a valid one), then the SSM may transition to the InboundSignalStatePhaseError. The inbound signaling timer (mInboundSignalingTimer) may then be started to time the phase error state. |
| InboundSignalStatePhaseError | In this state, the SSM may await the signal to return to an acceptable stable signal for the current state. If this state was entered because of a timeout, then the invalid signal may have persisted for a long time. In such case, the inbound signaling processing state may be moved back to the EstablishStateBaseSignal, and an event<br>INVALID_SIGNALING event may be sent to the system. The SSM may be moved to the state specified by the FILTER construct. If this state was entered | because of a signaling change, then the signal may be re-evaluated in the same manner as in the EstablishStateBaseSignal.

As previously described, the LSDF may define the allowed ABCD signaling sequence and the ones that are not allowed for each state. The GSI may only interpret the data and forward the events specified by the LSDF to the system.

System Command Processor

The system command processor may receive system commands and/or scan the current state XTRANSITIONS listed in the LSDF. If one is found, then the transition is taken. Within the XTRANSITION construct, the GSI may be instructed to start the transmission of an XSIGNAL. The XSIGNAL may contain the sequencing information of the raw ABCD bits.

CAS-Signaling State Machine: CSM

The CAS-signaling state machine, or CSM, may be a language and/or virtual machine according to aspects of the present disclosure, describing or otherwise relating to a finite-state automaton, an engineering-time translator, and/or a runtime virtual machine. The finite-state automaton (e.g., a state-machine) may govern the behavior of CAS signals, while the engineering-time translator may transform a textual representation of that automaton into, for example, a binary-file representation of the state-machine. The run-time virtual-machine may be governed by that binary-file representation of the state-machine.

However, regardless of whether the CAS signaling protocol is R2 line-signaling, R2 register-signaling, R1, or another CAS-signaling protocol, the nature of CAS signaling has certain aspects that may be represented by various CSM constructs. The signal may be composed of two orthogonal components: syntax and semantics. Syntax is the concrete representation of the signal, and semantics is the abstract meaning of the signal.

The CSM may allow the definition of the syntax of a signal, such as the declaration of a name representing the syntax of a signal. The CSM may also allow the declaration of a name representing the abstract semantics of a signal, abstract semantics of a delegation function, or a name representing the abstract semantics of a system-response command.

The CSM may also allow the declaration of a set of states which may fall into the category of semantics. States may fall into two categories: states entered due to the transmission of a signal, and states entered due to a delegation function awaiting a system-response command.

The CSM may also allow the expression of permitted transitions among states based on the semantic-name of a received signal, where such a transition causes a delegation function. The CSM may also allow the expression of permitted transitions among states based on the semantic-name of a received system-response command, where such a transition causes a signal to be transmitted. CSM may also allow the enabling versus disabling of certain transitions within a delegation function.

Via the CSM, the above CSM functions may be designated as part of a common core state-machine shared among variants of the signaling system, and/or as part of a particular variant signaling system that may override the common core state-machine. In a CAS-signaling variant, certain abstract signals may be permitted for use whereas other abstract signals may be prohibited from use. Thus, for a particular CAS-signaling variant, the textual language may permits declaring an abstract signal to be concrete or unused. Variants may fall into two categories: national-variants, which cannot be further extended, and topic-based variants, which can be used in one or more national-variants.

Within the context of the CSM, international signaling or any regional signaling system in its final concrete form may be deemed to be a "national" variant, focusing on the bilateral or multi-lateral agreements that are in place between multiple national standards bodies. Although a national-variant may be reused among other nations (e.g., from a former colonial power among its former colonies which are now independent that just happen to historically have inherited their telecom standards from the parent nation), it may be considered due diligence for an engineer to exhaustively, explicitly review and re-commit to all of the CSM statements that close off further extension, such as SIGPURGE, XSIGNAL, and RSIGNAL statements, as each new national-variant is added, even if that new national-variant is substantially similar to a pre-existing one.

A topic-based variant may be used initially in only one national-variant, and may then be later used in additional national-variants. As additional national-variants are added, it may be likely that, at the point of first usage in a national-variant (without investigation around the globe), at least one other nation somewhere in the world uses that same topic-based variant at the abstract-signal level. This reinforces the common perception that, although there is much variety among the national-variants (e.g., among the national-variants of R2 register-signaling), there may be consistent patterns that emerge as more and more national-variants.

These features of the CSM permit the description of: (1) a generally-obeyed common approach to the signaling system (such as promulgated in an international standard), and (2) the deviations away from that common approach (such as promulgated in a national standard). These language features may be arrived at to express R2 register-signaling and R2 line-signaling, where the overall semantics are generally similar among all R2 variants, but the syntax of the signals may vary among variants, and where the state-machine varies somewhat among variants.

In additional to a textual language for engineers to define a state-machine for a particular CAS-signaling scheme, a virtual machine may reside within multi-services fabric (MSF) software to execute the CSM state-machine at deployment-time. The CSM textual language may be translated into a binary-file representation. The MSF's CSM virtual machine may then read this CSM binary-file representation, which may govern run-time behavior in deployed switches and/or other media gateways.

Aspects of the CSM may be intended for use in implementing any CAS signaling protocol, including both CAS line-signaling and CAS register-signaling protocols. The R2 line-signaling system and R2 register-signaling system may each initially be supported. Additional signaling systems (e.g., R1) may then be added in the future.

For CAS line-signaling governing a PCM trunk, a PCM channel may first be agreed upon (such as by standardization) as the medium over which to communicate the line-signals (e.g., time-slot 16 for R2 line-signaling). For CAS register-signaling, additional PCM channels may be seized as a result of line-signaling activity. After PCM-channel seizure, register-signaling may proceed on that PCM channel to accomplish, for example, the transfer of information related to the called-party and the calling-party, and possibly whether the dialing resulted in the destination being rung or not rung.

Aspects of the present disclosure may describe a method to create a state machine that may be implemented in software, or possibly in hardware for additional throughput, such as to provide a data-oriented definition to govern the peculiarities of the operation each variant of a CAS-signaling system. A goal may be to place as much as 100% of the peculiarities of a variant of a CAS-signaling system in such a data-oriented state-machine definition and 0% in if-such-and-such-variant conditional branches interspersed throughout C++ code (as might otherwise be the case in a naïve design).

C++ functions for a CAS-signaling system may be kept separate from: (1) C++ functions implementing the behavior of other CAS-signaling systems (e.g., C++ functions for generic R2 may be kept separate from C++ functions for generic R1), and (2) the C++ functions implementing the behavior of variants deviating away from the generic CAS-signaling system (e.g., C++ functions for generic R2 may be are kept separate from C++ functions for each variant of R2). Likewise, C++ functions for a variant CAS-signaling system may be kept separate from: (1) C++ functions for variants of other CAS-signaling systems (e.g., C++ functions for an R2-variant may be kept separate from the C++ functions for each R1-variant), and (2) the C++ functions for other variants deviating away from the generic CAS-signaling system (e.g., C++ functions for a particular R2-variant may be kept separate from the C++ functions for each of the other R2-variants). Similarly, C++ functions for line-signaling may be kept separate from C++ functions for register-signaling.

The state-machine for the generic behaviors of a CAS-signaling system may be kept separate from: (1) state-machines for other CAS-signaling systems (e.g., the state-machine for generic R2 may be kept separate from the state-machine for generic R1), and (2) state-machines for each variant of the CAS-signaling system (e.g., the state-machine for generic R2 may be kept separate from the state-machines for each variant of R2). Likewise, the state-machine for a variant CAS-signaling system may be kept separate from: (1) state-machines for variants of other CAS-signaling systems (e.g., the state-machine for an R2-variant may be kept separate from the set of state-machines for R1-variants), and (2) state-machines for other variants deviating away from the generic CAS-signaling system (e.g., the state-machine for an R2-variant may be kept separate from the set of state-machines for other R2-variants). Similarly, CSM state-machines for line-signaling may be kept separate from CSM state-machines for register-signaling.

The CAS-signaling particulars may be represented as a textual language, and may be referred to as "CSM textual language" (e.g., when the CSM textual language must be differentiated from the CSM binary-file in-memory table or from the CSM virtual-machine) or "CSM" for short. For a variant deviating away from generic behavior, there may be three textual files. One textual file may be generic, describing the abstract (e.g., semantic) generic CAS-signaling behavior overriding the generic. Another textual file may be for a topic-based variant, describing abstract (e.g., semantic) deviations as a single topic that may not be nation-specific, where these deviations may be adjustments to the state-machine transitions and/or states comprising the state-machine's topology. Another textual file may be a national-variant, describing concreteness (e.g., syntax) of signals and matters related to terminating the extensibility in, potentially, a reliable, auditable, accountable way.

The CSM textual language may be translated into an in-memory table within the translator, which may specify the entry and exit criteria for each state, where each criterion may be converted from its abstract semantic representation to its concrete syntactic representation. The CSM translator may analyze this in-memory table for correctness at engineering-time, emitting translation-time errors to the engineer. Once all forms of incorrectness have been purged by the engineer, the CSM translator may then write information from this table as a single binary file containing a state-machine definition. This state-machine represented in binary data accepts in-coming CAS-signal events, timer-expiration events, and/or system-response commands (e.g., responses from delegation functions). This state-machine represented in binary data may emit out-going CAS-signals and delegation functions for processing behaviors (e.g., in C++), where each delegation function may be implemented as an invocation of a corresponding C++ function.

The compiled table may be referred to as a CAS-signaling descriptor (.sig) file, which may contain data-structures called signaling-descriptor constructs (SDCs). The SDCs within a .sig file may govern how the state-machine for a CAS-signaling scheme is executed within the CAS-signaling virtual machine.

Aspects of this method may allow engineers to implement a unified CAS-signaling core-infrastructure that can support additional CAS-signaling variants without any code changes, once a body of work is built up in the supporting behavior C++ functions for multiple variants of a CAS-signaling system. Until a substantially-sized body of work is built up from multiple variants of a CAS-signaling system, each additional variant implemented may not disturb previously-developed variants of that CAS-signaling system or, possibly, any other CAS-signaling systems, such as may be due to the partitioning described above.

CSM Textual Language

In the following description, the file-extension for CSM textual-language files is .csm. Moreover, portions of the following are described in the context of C++ code, although such aspects may also be applicable or readily adaptable to other code. Furthermore, the example statements described below are just that, examples, and other embodiments within the scope of the present disclosure may include variations of the following examples of statements, and/or additional statements, and/or may not include one or more of the following statement examples.

The CSM textual language and the .sig binary file format may both define various constructs that govern behavior when a .sig file is executed by a virtual machine (VM). Because textual-language statements correspond to SDCs executed by the VM, the vantage point of binary SDCs being executed in a VM is chosen for illustrative purposes in the following description. The following data may flow among various CSM statements.

EVT_ . . . in-coming semantic-CAS-signal-detected event: Each signal-detection event (where an in-coming semantic CAS-signal may be detected by hardware/DSP) may provide a stimulus originating in the processing of a hardware/DSP event to inform the state-machine that a tonal signal on this VM's associated PCM channel has been received. Each received-CAS-signaling-event may be presented to a state-machine by the VM as an ETRANSITION. The purposes of a CAS-signaling-event can be: (1) to advance the state-machine by one transition, and/or (2) to precipitate a behavior in C++ via a delegation function.

SIG_ . . . out-going signal-emission: Each CAS-signal may provide a stimulus originating in the state-machine to inform the VM to inform hardware/DSP to emit an out-going CAS-signal. The emission of an out-going CAS-signal may be precipitated by an XTRANSITION.

SYS_ . . . delegation function for C++ behavior: Each delegation function may provide a stimulus originating within the state-machine to the VM to invoke C++ code at the time of an ETRANSITION. The primary purpose of each delegation function may be to produce a system-response command. There can be a mapping from each delegation function SYS_ . . . identifier to a corresponding C++ function to be invoked. This mapping can be made known to the VM at run-time. Within a state-machine, the SYSREQUEST statement may be used to chain side-effects together differently in different contexts without the invoked C++ behaviors being responsible for detecting these different contexts and invoking different behavior via interspersed conditional-branches within the C++ code.

TMR_ . . . system-timer: Each system-timer may provide a way to hook together a system-timer's time-out with a corresponding C++ function to precipitate time-based transitions in the state-machine accompanied by invocation of corresponding C++ behavior. System-timers may include a transition timer, an exit timer, and/or an explicit timer. The transition timer may be automatically canceled by the VM when the VM executes any transition, possibly even if the transition is re-entry to the same state-machine state. The exit timer may be automatically canceled by the VM when the VM transitions to a new state-machine state. The lifetime of exit timers may only be one state-machine state. The explicit timer may only be reset by the VM during transitions which explicitly request that system-timer be reset or explicitly canceled via C++ during a delegation function.

CMD_ . . . system-response command: Each system-response command may provide a stimulus originating in C++ to express to the state-machine that C++ has decided how to proceed next in response to the prior delegation function. Each system-response command may be presented to a state-machine via the VM via an XTRANSITION in the CSM textual language.

TMO_ . . . system-timeout: Each system-timeout may provide a stimulus originating in the VM to inform the state-machine that an identified timer has expired and that some transition is to be precipitated which in turn precipitates a delegation function. When using named system-timers, such as in an R2REGISTER signaling-system, this time-out may be presented as an ETRANSITION. When using unnamed system-timers, such as in R2LINE_PCM signaling system, this time-out may be presented as a TTRANSITION (without any TMO_ . . . identifier). As such, the R2REGISTER signaling-system may permit multiple system-timers (in any combination of EXPLICIT, EXIT, or TRANSITION modes) to be running concurrently (possibly because each system-timer's separate identity may be retained and, thus, may be separately processed), whereas R2LINE_PCM may currently permit only one unnamed system-timer to be running at any time (in defacto TRANSITION mode).

ADJ_ . . . set of automated-adjustments: Each topic-based variant (and possibly each national-variant) of a CAS-signaling system may need to restrict the generic state-machine in some way. For example, a single backward-signal may be overloaded to have different meanings in a sequence of contexts, such as in Indonesia, where their A-6 backward-signal first requests CPC then shifts to request CLI digits, which differs from other national-variants and the ability of ITU international variants to query CPC and CLI in any order. Such restrictions may be accomplished via the AUTOADJ statement declaring each set of automated-adjustments to the state-machine's transitions. A set of automated-adjustments may be precipitated as a side-effect of a transition, much as delegation functions may be precipitated as a side-effect of a transition. In addition, a delegation function may specify an automated-adjustment as a cascading side-effect of a delegation function, much as another delegation function may be precipitated as a cascading side-effect of a delegation function.

The partitioning of various categories of C++ functions away from each other may be accomplished by keeping each C++ function invoked by the VM tied directly to a single SYS_ . . . delegation function. These delegation functions themselves may be partitioned between generic activities and topic-based variant activities and, thus, the corresponding set of C++ functions are similarly partitioned. Each C++ function corresponding to a delegation function may be subservient to that delegation function in that the C++ function may be responsible for a narrow behavior, implied as side-effect of that transition as indicated by the delegation function's name.

Despite this partitioning, C++ function corresponding to a delegation function may interact with its own state-machine or another state-machine, although possibly in a controlled way such as by sending CMD_ . . . system-response commands to a state-machine (e.g., either the same state-machine or another state-machine). For example, in a line-signaling C++ function corresponding to a delegation function in a line-signaling state-machine, a CMD_INREG_SEIZE system-response command or a CMD_OUTREG_SEIZE system-response command may be input into the state-machine for the seized PCM channel, possibly depending on provisioned direction of the line-signaling or on dynamic arbitration of direction of the line-signaling in the case of both-way line-signaling. As another example, aberrant register release, register release due to successful dialing-phase of connection establishment, and/or register release due to a failed dialing-phase of attempted connection establishment may input a clear-forward system-response command into that trunk's line-signaling state-machine (from the in-coming register's perspective) or a clear-backward system-response command into that trunk's line-signaling state-machine (from the out-going register's perspective).

CSM Textual-Language Statements

In certain textual-language statements, some parameters may have zero-or-one occurrences, zero-or-multiple occurrences, or one-or-multiple occurrences. The Kleene notation may be "Kleene option: [zero-or-one occurrences]?" or "Kleene star: [zero-or-multiple occurrences]*" or "Kleene plus: [one-or-multiple occurrences]+".

SIGSYSTEM: Selecting a Type of Signaling System

The CAS-signaling state-machine textual language and virtual machine may support multiple CAS-signaling systems. Examples of supported types of CAS-signaling systems are listed in the name field in the table below. Only one SIGSYSTEM statement may appear per .csm file. The SIGSYSTEM statement may be required to be the first statement of each .csm file. The choice of signaling-system may affect certain signal-oriented parameters in other statements, as shown in the portions of the following description.

TABLE 1

Example SIGSYSTEM statement in the CSM textual language
SIGSYSTEM (typeName)

| Parameter name | type | Description |
| --- | --- | --- |
| typeName | keyword | R2LINE_PCM: Signaling System R2's line-signaling in PCM-channel mode (as opposed to the older analog mode with audio tones) is selected<br>R2REGISTER: Signaling System R2's register-signaling is selected for this textual-language file |

VARIABLE: Defining a Provisionable Variable

These may be variables that are defined on a per-state-machine basis, and that may be configured by the user. Each of the variables is given a name, and the given names for these variables may have no meaning outside a single state-machine generated by a single invocation of the translator. These names may be used wherever a literal integer constant may be used in the CSM textual language.

SYSTIMER: Defining a Timer that Precipitates a System-Timeout

System timers may permit C++ to inject system-timeouts related to resting too long in a single state or traversing too long among a set of state-machine states (such as where, had the proper transition occurred, a C++ function invoked due to a delegation function would have explicitly canceled that multi-state timer before its expiration). This statement may permit a state-machine to have two or more concurrent timers, where the expiration of each may be separately identified, and where differing resultant delegation functions may precipitate different behavior in C++.

TABLE 2

Example VARIABLE statement in the CSM textual language
VARIABLE (nameMsf, minValueProvision, maxValueProvision, defaultValueProvision, unitsProvision, multiplierProvisionToMsf, longTagProvision, shortTagProvision, hoverTextProvision)

| parameter name | key-mode / attribute | type | description |
| --- | --- | --- | --- |
| nameMsf | key1 | identifier | the name of the variable for use among engineers in source code |
| minValueProvision | attribute | UInt32 | the minimum value allowed for the variable at provisioning-time |
| maxValueProvision | attribute | UInt32 | the maximum value allowed for the variable at provisioning time |
| defaultValueProvision | attribute | UInt32 | the initial value used to set the variable at provisioning-time |
| multiplierProvisionToMsf | attribute | UInt32 | Multiply the in-coming provisioned value by this amount to convert the units at provisioning-time to the units used by this state-machine in the MSF. For timers this value is typically either 1 (i.e., the same units are in used by this state-machine and at provisioning-time: milliseconds) or 1000 (i.e., the provisioning-time units are seconds, but the units used by the state-machine are milliseconds) |
| unitsProvision | attribute | single-line string with suggested max length of 8 characters | the units used to measure this variable as presented to human-beings at provisioning-time. The use of standard abbreviations (especially of SI units) is strongly recommended. |
| longTagProvision | attribute | single-line string with suggested max length of 20 characters | a somewhat-abbreviated name of this variable for use as column-headers in tables of HMIs. |
| shortTagProvision | attribute | single-line string with suggested max length of 10 characters | a drastically-abbreviated name of this variable for use as column-headers in tables of HMIs. |
| hoverTextProvision | attribute | single-line string with suggested max length of 80 characters | an informational character string displayed to a human-being at HMIs to aid him in deciding on how to set up this variable. When the human-being is using a GUI, this text is presented in the bottom line when the mouse cursor hovers over the field. |
| key | description | | |
| mode1 | unique identification of this variable in the textual language | | |

TABLE 3

Example SYSTIMER statement in the CSM textual language
SYSTIMER (name, milliseconds, cancelWhen[, maxCount]?)

| parameter name | key-mode / attribute | type | description |
| --- | --- | --- | --- |
| name | key1 | identifier | TMR_... : the name of the system-timer in the textual language. If this timer were to expire, a system-timeout is sent by the VM to the state-machine, where that system-timeout is correspondingly-named TMO_... in the textual language. |
| milliseconds | attribute | UInt32 | >0: timeout value, measured in milliseconds. In case of a timeout a TTRANSITION is executed.<br>variableName: value is provided by provisionable variable |

TABLE 3-continued

Example SYSTIMER statement in the CSM textual language
SYSTIMER (name, milliseconds, cancelWhen[, maxCount]?)

| parameter name | key-mode / attribute | type | description |
|---|---|---|---|
| cancelWhen | attribute | keyword | EXPLICIT: This timer can be cancelled only explicitly during a delegation function, if this timer has not yet expired.<br>EXIT: The VM automatically cancels this timer upon next transition to any state other than the current state, if this timer has not yet expired.<br>TRANSITION: The VM automatically cancels this timer upon next transition to any state (including possibly the same state) in the state-machine, if this timer has not yet expired. |
| maxCount | attribute | identifier | optional. The maximum number of times that this system-timer name may expire. If maxCount is exceeded, the VM places this state-machine into the Error state. |
| key | description | | |
| mode1 | unique identification of this timer or its corresponding system-timeout in the textual language | | |

SIGGROUP: Declaring a Signal-Group

Signaling tones may be reused in different states of a state-machine, possibly with different meanings that may based on previously-established context in the state machine. Each state's out-going XTRANSITIONs may transmit no more than one group of signals. Groups of signaling tones may be the mechanism for communicating whether a signal is forward or backward in direction.

The groups may also be canonical. In R2 register-signaling, it is canonical to refer to Groups I, II, III, A, and B, where 1, II, and III are groups of forward signals whereas A and B are groups of backward signals. However, the groups may also be discussed without using the term "group." For example, in R2 line-signaling, it is canonical to refer to the set of forward signals and the set of backward signals. For the purposes of this CAS-signaling state-machine language, R2 line-signaling forward signals and R2 line-signaling backward signals are two signal-groups.

ASIGNAL: Declaring an Abstract Signal

Signaling tones may be reused in different states of a state-machine, possibly with different meanings based on previously-established context in the state machine. Each state's out-going XTRANSITIONs may transmit no more than one group of signals. Groups of signaling tones may be the mechanism for communicating whether a signal is forward or backward in direction.

Abstract signals are signals which have been declared via ASIGNAL, but for which no concrete-signal is defined. This can be useful to describe a generic state-machine which is a superset of any particular variant. The variant may define concrete signals (e.g., XSIGNALs or RSIGNALs for R2LINE_PCM, or CSIGNALs for R2REGISTER) for signals that the variant can receive and/or transmit.

TABLE 4

Example SIGGROUP statement in the CSM textual language
SIGGROUP (name, direction)

| parameter name | key-mode / attribute | type | description |
|---|---|---|---|
| name | key1 | identifier | GRP_ . . . : the name of the signal-group in the textual language, GRP_0, GRP_I, GRP_II, GRP_III, GRP_A, GRP_B. |
| direction | attribute | keyword | FORWARD: signaling tones in this group are to be transmitted by the "out-going" register and received by the "in-coming" register<br>BACKWARD: signaling tones in this group are to be transmitted by the "in coming" register and received by the "out-going" register |
| key | description | | |
| mode1 | unique identification of this signal-group in the textual language | | |

TABLE 5

Example ASIGNAL statement in the CSM textual language
ASIGNAL (basename, signalGroup)

| parameter name | key-mode / attribute | type | description |
|---|---|---|---|
| basename | key1 | identifier | The basename of the abstract signal. In all other statements, this basename is prefixed with either 1) EVT__when the signal is an in-coming received signal or 2) SIG__when the signal is an out-going transmitted signal. |
| signalGroup | attribute | keyword | GRP__ . . . : the name of the signal-group to which this abstract signal belongs |

| key | Description |
|---|---|
| mode1 | unique identification of this signal-group in the textual language |

XSIGNAL: Declaring an Abstract Signal to be Transmittable Concrete Signal for R2LINE_PCM The XSIGNAL statement may define how to output the outbound ABCD bits for R2 line-signaling over a PCM channel of a TDM trunk. Such a signal may not be defined merely by the ABCD bit-pattern, but also possibly by a time-duration in which that bit-pattern is exhibited. Different signals can have the same ABCD bit-pattern but different time-durations. The minimum time duration of a longer-length PCM line-signal may be required to not be less than the maximum time-duration of a shorter-length PCM line-signal, such as where this would create an ambiguity, particularly an unresolvable ambiguity, on the opposing/receiving/remote end of the PCM channel.

RSIGNAL: Declaring an Abstract Signal to be a Receivable Concrete Signal for R2LINE_PCM The RSIGNAL statement may define how to detect inbound ABCD bits as a valid inbound signal for R2 line-signaling over a PCM channel of a TDM trunk. Such a signal may not be defined merely by the ABCD bit-pattern, but possibly also by a time-duration in which that bit-pattern is exhibited. Different signals can have the same ABCD bit-pattern but different time-durations. The minimum time dura-

TABLE 6

Example XSIGNAL statement for R2LINE_PCM in the CSM textual language
XSIGNAL (name, ABCDbits[, pulseFlashTime[, guardTime]?]?)

| parameter name | key-mode / attribute | type | description |
|---|---|---|---|
| name | key1 | identifier | SIG__ . . . : the name of the outbound signal in the textual language |
| ABCDbits | attribute | four of 1, 0, P, or F | 0: output 0 = on-hook<br>1: output 1 = off-hook<br>P: pulse from previously-sustained 0 to 1 for pulseFlashTime milliseconds, returning back to sustained 0<br>F: flash from previously-sustained 1 to 0 for pulseFlashTime milliseconds, returning back to sustained 1 |
| pulseFlashTime | attribute | UInt32 | P or F in ABCDbits: >0 length of pulse/flash in milliseconds |
| guardTime | attribute | UInt32 | This field is optional if pulseTimer is defined and dormant otherwise. This field defines the length of time in milliseconds that the outbound signaling has to be stable before a new command is accepted. Meanwhile the inbound signaling is ignored until the guard time has expired and then the inbound signaling is re-evaluated. |

| key | description |
|---|---|
| mode1 | unique identification of this transmittable signal in the textual language | tion of a longer-length PCM line-signal may be required to not be less than the maximum time-duration of a shorter-length PCM line-signal with the same ABCD bit-patter, such as where this would be a prohibited ambiguity, particularly an unresolvable ambiguity.

TABLE 7

Example RSIGNAL statement for R2LINE_PCM in the CSM textual language
RSIGNAL (name, ABCDbits, minTime, maxTime)

| parameter name | key-mode / attribute | type | description |
|---|---|---|---|
| name | key1 | identifier | EVT__ . . . : the name of the inbound signal in the textual language |
| ABCDbits | attribute | four of 1, 0, P, or F | 0: output 0 = on-hook<br>1: output 1 = off-hook |

TABLE 7-continued

Example RSIGNAL statement for R2LINE_PCM in the CSM textual language
RSIGNAL (name, ABCDbits, minTime, maxTime)

| parameter name | key-mode / attribute | type | description |
| --- | --- | --- | --- |
| | | | P: pulse from previously-sustained 0 to 1 for pulseFlashTime milliseconds, returning back to sustained 0 |
| | | | F: flash from previously-sustained 1 to 0 for pulseFlashTime milliseconds, returning back to sustained 1 |
| minTime | attribute | UInt32 | >0 minimum length of sustained signal, measured in milliseconds. The minTime of this ABCD bit-pattern must not be less than the maxTime of the same ABCD bit-pattern in another RSIGNAL statement. |
| maxTime | attribute | UInt32 | >0 maximum length of sustained signal, measured in milliseconds, after which this ABCD bit-pattern no longer defines the received signal named name, but rather presumably some other signal with an even larger minimum time for the same ABCD bit-pattern. The maxTime of this ABCD bit-pattern must not be greater than the minTime of the same ABCD bit-pattern in another RSIGNAL statement. This field must be provided for any ABCD bit-pattern that contains a P or an F. |
| key | description | | |
| mode1 | unique identification of this receivable signal in the textual language | | |

FILTER: Detecting a Signaling Shower for R2LINE_PCM

Signal showering can occur when signals change faster than the state machine can reach a terminus or valid state. This is often caused when the physical layer has a termination provision mismatch or when framing is lost on the trunk. The mismatch can cause a rapid change in the signal, such as because the ABCD bits containing the signaling information vary arbitrarily per unit of time, whereas valid line-signaling changes at a slower rate. The signaling state may be required to protect against such errors and place the port in the ERROR state. There may be no more than one FILTER statement in a state-machine.

Signal showering may be a risk where the CSM state-machine is directly interacting with digital signaling bits, such as in the R2LINE_PCM signaling-system, where the validity of the bits depends on both correct provisioning and time-synchronized framing. However, for audio-tonal signaling-systems, the settling time of detection of an audio tone over a period of time may preclude sending a signal-detection event from DSPs to the state-machine any more frequently than, for example, tens of milliseconds. This infrequency of detecting a audio-tonal signal may drastically reduce the need for signal shower prevention due to a chaotic bit stream.

CSIGTYPE: Declaring a Type of Transmittable Concrete Signal for R2REGISTER

Concrete signals may be transmitted by one register and received by an opposing register at the other end of a seized PCM channel. The majority of the characteristics that define a transmittable signal may also define a receivable signal. For example, minimum and maximum time-bounds on a pulse may apply to both the transmitting end and the receiving end. The minimum time to inhibit detection of an in-coming signal may correspond to a minimum time bound (possibly minus transmission latency) that the opposing register should refrain from sending a signal. They may be substantially mirror images of each other that must be kept synchronized. The CSIGTYPE statement may permit declaring a type of signal (e.g., compelled) that may be utilized in a register-signaling scheme along with the time-oriented characteristics common to that type of signal. Register signaling may be: (a) 100% fully-compelled for both forward and backward signals, (b) substantially fully-compelled with a minority of spontaneous/non-compelled backward-signaling pulses, (c) 100% semi-compelled (e.g., 100% compelled for forward signals and 100% pulses for backward signals), or (d) substantially semi-compelled with a minority of spontaneous/non-compelled backward-signaling pulses.

TABLE 8

Example FILTER statement for R2LINE_PCM in the CSM textual language
FILTER (count, timeDuration)

| parameter name | key-mode / attribute | type | description |
| --- | --- | --- | --- |
| count | key1 | identifier | the minimum number of transitions while the VM is in the undecided state to trigger a signaling shower. |
| timeDuration | attribute | keyword | the time, measured in milliseconds, that the VM may remain in the undecided state |

Concrete Signals for R2REGISTER

Signals may be defined to either be transmitted or received by a state. This is because, upon transmission or upon receipt, different aspects such as timer characteristics may come into play.

Patterns may emerge among various sets of signals in each of these categories of R2-variants. The CSIGTYPE statement may capture the time-oriented characteristics of each such set in an R2-variant, such that typographical (or maintenance) errors may not errantly define one signal differently than other members of the set of similar signals. As many CSIGTYPE statements as needed may be declared.

TABLE 9

Example CSIGTYPE statement
CSIGTYPE (name, minPulseOnTime, maxPulseOnTime, minPulseOffForeTime, minPulseOffAftTime, minRcvOffTime)

| parameter name | key-mode / attribute | type | description |
|---|---|---|---|
| Name | key1 | identifier | the name of the signal-type in the textual language |
| minPulseOnTime | attribute | UInt16 | >0: minimum length of pulse in milliseconds. As a pulsed signal, by definition, this signal is either semicompelled or noncompelled/spontaneous. 0: This continuous signal is (fully-) compelled. As such the length of signal is implicit in the handshaking with the opposing register, where the opposing register has a minimum time of continuous MF tone that must be exhibited before detection can be declared. variableName: Value is provided by run-time tunable variable. |
| maxPulseOnTime | attribute | UInt16 | >0: maximum length of pulse in milliseconds. As a pulsed signal, by definition, this signal is either semicompelled or noncompelled/spontaneous. 0: This continuous signal is (fully-) compelled. As such the length of signal is implicit in the handshaking with the opposing register, where the opposing register has a minimum time of continuous MF tone that must be exhibited before detection can be declared variableName: Value is provided by run-time tunable variable. |
| minPulseOffForeTime | attribute | UInt16 | ≧0: length of time in milliseconds that silence must be exhibited beforehand in the same direction as this signal, after which VM is permitted to transmit this CSIGNAL's MF_ . . . tone. |
| minPulseOffAftTime | attribute | UInt16 | ≧0: length of time in milliseconds that silence must be exhibited afterwards in the same direction as this signal, after which VM is permitted to transmit the next CSIGNAL's MF_ . . . tone |
| minOpposingNondetectTime | attribute | UInt16 | >0: minimum length of time in milliseconds during which receipt of a signal is prohibited from being detected in the opposing direction 0: This continuous signal is (fully-) compelled. As such the minimum length of signal is implicit in the handshaking with the opposing register, where the opposing register has a minimum time of continuous MF tone that must be exhibited before detection can be declared. variable Name: Value is provided by run-time tunable variable. |
| key | description | | |
| mode1 | unique identification of this type of concrete signal in the textual language | | |

CSIGNAL: Declaring an Abstract Signal to be a Transmittable or Receivable Concrete Signal for R2REGISTER The CSIGNAL statement may define how to transmit or receive an MF tone as a valid inter-register signal. For distinguishing pulsed versus compelled backward signals in a predominantly-compelled R2-variant, such a signal may not be defined merely by the MF tone, but also possibly by a time-duration in which that MF tone is exhibited. Different signals may have the same MF tone but different time-durations. The minimum time duration of a longer-length register-signal may be required to not be less than the maximum time-duration of a shorter-length register-signal with the same MF tone, as this may be a prohibited ambiguity. When no signal is being transmitted, silence may be transmitted on the PCM channel within the R2REGISTER scheme. No more than one signal may be transmitted at any single moment in time, although two consecutive signals may appear back-to-back, such as a spontaneous/non-compelled 125 ms A-3 pulse followed immediately by a compelled B-4 in the India national-variant.

TABLE 10

Example CSIGNAL statement for R2REGISTER in the CSM textual language
CSIGNAL (name, mf, csigtypeName)

| parameter name | key-mode / attribute | type | description | | |
|---|---|---|---|---|---|
| basename | key1 | identifier | Matches basename in previously-declared ASIGNAL statement. | | |
| Mf | attribute | keyword | MF_ . . . : | the name of the MF tone from the set: | |
| | | | | MF_1: | 1380 & 1500 Hz if direction = FORWARD; 1140 & 1020 Hz if direction = BACKWARD |
| | | | | MF_2: | 1380 & 1620 Hz if direction = FORWARD; 1140 & 900 Hz if direction = BACKWARD |

TABLE 10-continued

Example CSIGNAL statement for R2REGISTER in the CSM textual language
CSIGNAL (name, mf, csigtypeName)

| parameter name | key-mode / attribute | type | description |
|---|---|---|---|
| | | MF_3: | 1500 & 1620 Hz if direction = FORWARD; 1020 & 900 Hz if direction = BACKWARD |
| | | MF_4: | 1380 & 1740 Hz if direction = FORWARD; 1140 & 780 Hz if direction = BACKWARD |
| | | MF_5: | 1500 & 1740 Hz if direction = FORWARD; 1020 & 780 Hz if direction = BACKWARD |
| | | MF_6: | 1620 & 1740 Hz if direction = FORWARD; 900 & 780 Hz if direction = BACKWARD |
| | | MF_7: | 1380 & 1860 Hz if direction = FORWARD; 1140 & 660 Hz if direction = BACKWARD |
| | | MF_8: | 1500 & 1860 Hz if direction = FORWARD; 1020 & 660 Hz if direction = BACKWARD |
| | | MF_9: | 1620 & 1860 Hz if direction = FORWARD; 900 & 660 Hz if direction = BACKWARD |
| | | MF_10: | 1740 & 1860 Hz if direction = FORWARD; 780 & 660 Hz if direction = BACKWARD |
| | | MF_11: | 1380 & 1980 Hz if direction = FORWARD; 1140 & 540 Hz if direction = BACKWARD |
| | | MF_12: | 1500 & 1980 Hz if direction = FORWARD; 1020 & 540 Hz if direction = BACKWARD |
| | | MF_13: | 1620 & 1980 Hz if direction = FORWARD; 900 & 540 Hz if direction = BACKWARD |
| | | MF_14: | 1740 & 1980 Hz if direction = FORWARD; 780 & 540 Hz if direction = BACKWARD |
| | | MF_15: | 1860 & 1980 Hz if direction = FORWARD; 660 & 540 Hz if direction = BACKWARD |
| csigtypeName | attribute | identifier | The name of a previously-declared CSIGTYPE to provide the time-oriented characteristics of signal name for both transmission and reception. |
| key | description | | |
| mode1 | unique identification of this concrete-signal in the textual language | | |

(where direction = basename's ASIGNAL.signalGroup's SIGGROUP.direction)

SIGPURGE: Purging an Abstract Signal that has no Concrete Signal for R2REGISTER The SIGPURGE statement may permit an R2-variant to explicitly declare its intent to purge generic R2's abstract register-signals that have no concrete representation in that R2-variant. This may permit the textual-language translator to perform an audit where an R2-variant must either: (1) explicitly declare (and use) concrete representation for a given abstract signal or (2) explicitly purge that abstract signal. Abstract signals may not be permitted to ambiguously remain unpurged, but possibly also without concrete representation. This statement may also prompt engineers to consider the impact of additional evolution to generic R2 on each R2-variant, such as whether the additional evolution of generic R2 is an enhanced understanding of R2 throughout all variants which should be picked up by most/all variants, or whether the additional evolution of generic R2 is an expansion of generic R2 to handle some other R2-variants, whose characteristics may not apply to previous R2-variants. This statement may also serve as an explicit not-in-use indicator, such that a particular abstract signal may be eligible for removal from generic R2 when all R2-variants purge it.

TABLE 11

Example SIGPURGE statement in the CSM textual language
SIGPURGE (name)

| parameter name | key-mode / attribute | type | description |
|---|---|---|---|
| name | key1 | identifier | The basename of the abstract signal for which this R2-variant does not define a concrete representation. In all other statements, this basename is prefixed with either 1) EVT_ when the signal is an in-coming received signal or 2) SIG_ when the signal is an out-going transmitted signal. |
| key | description | | |
| mode1 | unique identification of this purely-abstract signal with no concrete representation in the textual language | | |

SYSREQUEST: Declaring a Delegation Function

Reasons to require that the name of a delegation function, of a system-response command, and/or of a set of system-response commands be explicitly declared may include detecting misspellings and so that the translator is made aware of the connected flow of delegation function to system-response, such as performing an accounting that all cases are addressed. By keeping the translator informed regarding the flow of delegation functions at the destination of an ETRANSITION through the state to one or more system-response commands precipitated transitions emanating out of that state, the translator can analyze the entire set of the three categories of .csm files (e.g., generic, topic-based variant, and national-variant) for completeness to detect omissions at engineering-time.

TABLE 12

Example SYSREQUEST statement in the CSM textual language
SYSREQUEST (name[, precipitate]+)

| parameter name | key-mode / attribute | type | Description |
|---|---|---|---|
| name | key1 | identifier | SYS_ . . . : the name of the delegation function in the textual language and in C++. |
| precipitate | attribute | identifier | CMD_ . . . : the name of the set of system-response commands that delegation function name precipitates-i.e., the name of the type of the values returned by the C++ function corresponding to delegation function name. SYS_ . . . : Another delegation function that delegation function name precipitates-i.e., the name of a delegation function whose corresponding C++ function that the VM will invoke after the C++ function corresponding to delegation function name returns. ADJ_ . . . : Automated adjustment to the topology of the state-machine that delegation function name precipitates. |
| key | Description | | |
| mode1 | unique identification of this delegation function in the textual language | | |

SYSRESPONSE: Declaring a System-Response

TABLE 13

Example SYSRESPONSE statement in the CSM textual language
SYSRESPONSE (typenameOfSetOfSystemResponses, nameOfMemberSystemResponse)

| parameter name | key-mode / attribute | type | description |
|---|---|---|---|
| typenameOfSetOfSystemResponses | attribute1 | identifier | CMD_ . . . : the name of the type of delegation function in the textual language and in C++. By convention a lower-case token in typenameOfSetOfSystemResponses indicates the part the varies among all of the system-response commands in this set. |
| nameOfMemberSystemResponse | key1 | identifier | CMD_ . . . : the name of the delegation function in the textual language and in C++. |
| key | description | | |
| mode1 | unique identification of this delegation function in the textual language and in C++ | | |

STATE: Declaring a Member of the Set of States

States may be required to be defined in a state-machine before they are used. States may be declared prior to use so that, for example, typographical errors do not accidentally cause the implicit declaration of a new state.

TABLE 14

Example STATE statement in the CSM textual language
STATE (name, type, sigGroupOut)

| parameter name | key-mode / attribute | type | description |
|---|---|---|---|
| name | key1 | identifier | the name of the state in the textual language. |
| type | attribute | keyword | EARRIVAL: All arriving transitions must be ETRANSITIONs. XARRIVAL: All arriving transitions must be XTRANSITIONs. |
| sigGroupOut | attribute | identifier | GRP_ . . . : the name of the signal-group permitted to be transmitted from this state by XTRANSITIONS, if any NONE: Only ETRANSITIONs are permitted to have this state as their origin-state. |
| key | Description | | |
| mode1 | unique identification of this state in the textual language | | |

INIT: Choosing the Initial State

A single initial state may be required to be chosen in a state-machine which may be required to be previously-declared with the STATE statement. The initial state, for example, is the point of entry to the state machine at the time that the VM initializes the state-machine in the MSF. There may be only one INIT statement in a .csm file.

TABLE 15

Example INIT statement in the CSM textual language
INIT (stateName)

| parameter name | key / attribute | type | description |
|---|---|---|---|
| stateName | attribute | identifier | the name of a previously-declared state which is to serve as the initial state when the VM initializes the state-machine |

Transitions for Signaling-Systems Other than R2LINE_PCM

There may be at least three statements for defining a transition. In other state-machine languages, there may be only one type of input stimuli. However, in the CSM example that follows, there are three types of input stimuli: (1) EVT_ . . . : detection of an in-coming semantic CAS-signal by hardware/DSP, which is made known to the VM, (2) CMD_ . . . : a system-response command from a delegation function's C++ function, which is made known to the VM, and (3) TMO_ . . . : a system-timeout of a system-timer managed by the VM.

ETRANSITION: Defining a Transition Due to an In-Coming Semantic CAS-Signal

The following transition-statement may be used to instruct the VM to invoke a delegation function's C++ function when the VM receives an in-coming CAS-signal-detection event.

TABLE 16

Example ETRANSITION statement in the CSM textual language
ETRANSITION override (fromState, stimulusName, toState, requestName[, timerName]*)

| parameter name | key-mode / attribute | type | description |
|---|---|---|---|
| override | control | keyword | OVERRIDE: optional. In a topic-based variant or a national-variant the corresponding generic ETRANSITION may be overridden, where "corresponding" is determined via the mode-1 key as shown below. |
| fromState | key1,2 | identifier | the name of a previously-declared state that is the origin of the transition from which this transition emanates |
| stimulusName | key1,2 | identifier | EVT_ . . . : When the VM receives a semantic-CAS-signaling-detected event, named stimulusName, while in the context of fromState, the VM is to traverse this transition to toState.<br>CMD_ . . . : When the VM receives a system-response command, named stimuluslName, while in the context of fromState, the VM is to traverse this transition to toState. No XTRANSITION for the same combination of CMD_ . . . , fromState, and toState is permitted.<br>TMO_ . . . : When the VM receives a system-timeout, named stimulus1Name, while in the context of fromState, the VM is to traverse this transition to toState. |
| toState | key1 attribute2 | identifier | the name of a previously-declared state that is the destination of the transition to which this transition traverses |
| requestName | attribute | identifier | SYS_ . . . : When the VM traverses this transition, the VM is to invoke the C++ function associated with delegation function requestName as a side-effect.<br>ADJ_ . . . : When the VM traverses this transition, the VM is to perform the set of adjustments declared as members of the set of automated adjustments named requestName. |
| timerName | attribute | identifier | TMR_ . . . : a set of zero or more names of previously-declared system-timers that are to be started as a side-effect by the VM when the VM traverses this transition |
| key | | | description |
| mode1 | | | The set of fields marked as key in this mode is sufficient to uniquely identify this transition regardless of context. |
| mode2 | | | Given that state-machine's current state is in the context of fromState and given that VM receives received-CAS-signaling-event rsignalName from hardware/DSP, VM uses this key within this context to uniquely determine which transition out-going from fromState to traverse. |

An ETRANSITION may permit only the emission of a delegation function to the VM, which may then invoke a C++ function associated with that delegation function. If a design wishes to emit an out-going CAS-signal directly from an ETRANSITION instead of invoking a delegation function's C++ function, the design may be considered malformed. The design may be required to be reworked so that the following activities occur, possibly in order: (1) The ETRANSITION precipitates a delegation function sysReq, (2) sysReq instructs the VM to invoke a C++ function sysReqFunc associated to sysReq, (3) sysReqFunc submits a system-response command sysRespCmd back to the VM, and (4) the VM then processes sysRespCmd via an XTRANSITION, which may be permitted to emit an out-going CAS-signal.

XTRANSITION: Defining a Transition Due to an Incoming System-Response Command The XTRANSITION statement may be used to instruct the VM to emit an outgoing CAS-signal when the VM receives a system-response command from a C++ function invoked by the VM due to a previous delegation function.

TABLE 17

Example XTRANSITION statement in the CSM textual language
XTRANSITION override (fromState, cmdName, toState, xsignalName[, requestName]? [, timerName]*)

| parameter name | key-mode / attribute | type | description |
|---|---|---|---|
| override | control | keyword | OVERRIDE: optional. In a topic-based variant or a national-variant the corresponding generic XTRANSITION may be overridden, where "corresponding" is determined via the mode-1 key as shown below. |
| fromState | key1,2 | identifier | the name of a previously-declared state that is the origin of the transition from which this transition emanates |
| cmdName | key1,2 | identifier | CMD_ . . . : the name of the system-response command received by the VM from a delegation function's C++ function. No ETRANSITION for the same combination of CMD_ . . . , fromState, and toState is permitted. |
| toState | key1 attribute2 | identifier | the name of a previously-declared state that is the destination of the transition to which this transition traverses |
| xsignalName | attribute | identifier | SIG_ . . . : the name of a previously-declared transmit-signal that is to be emitted as a side-effect by the VM when the VM traverses this transition |
| requestName | attribute | identifier | SYS_ . . . : When the VM traverses this transition, the VM is to invoke the C++ function associated with delegation function requestName as a side-effect. ADJ_ . . . : When the VM traverses this transition, the VM is to perform the set of adjustments declared as members of the set of automated adjustments named requestName as a side-effect. |
| timerName | attribute | identifier | TMR_ . . . : a set of zero or more names of previously-declared system-timers that are to be started as a side-effect by the VM when the VM traverses this transition |
| key | description | | |
| mode1 | The set of fields marked as key in this mode is sufficient to uniquely identify this transition regardless of context. | | |
| mode2 | Given that state-machine's current state is in the context of fromState and given that VM receives system-response command cmdName from a delegation function's C++ function, VM uses this key within this context to uniquely determine which transition out-going from fromState to traverse. | | |

REPOST: Dispatching from Proper Context

When an in-coming CAS-signaling event EVT_ . . . is processed in the context of a tentacle, the tentacle may contain only ETRANSITIONS related to that tentacle's topic. But that EVT_ . . . may be introducing a new topic that is to be dispatched to another tentacle entirely. The REPOST statement may permit that off-topic EVT_ . . . to be dispatched by that tentacle's dispatcher, which is may be likely to have the ETRANSITIONs defined to properly dispatch EVT_ . . . to the proper tentacle.

TABLE 18

Example REPOST statement in the CSM textual language
REPOST (ANY_OTHER_EVT, stateWrongContext, stateBetterContext, sysRequestClosingOffWrongTentacle)

| parameter name | key-mode / attribute | type | description |
|---|---|---|---|
| ANY_OTHER_EVT | attribute | keyword | ANY_OTHER_EVT: matches any EVT_ . . . other than those overtly handled by the set of ETRANSITIONs in the form (stateWrongContext, EVT_ . . . , stateBetterContext, . . . ) |
| stateWrongContext | key1 | identifier | the name of a previously-declared state that is the wrong context to handle the CAS-signaling event ANY_OTHER_EVT |

TABLE 18-continued

Example REPOST statement in the CSM textual language
REPOST (ANY_OTHER_EVT, stateWrongContext, stateBetterContext, sysRequestClosingOffWrongTentacle)

| parameter name | key-mode / attribute | type | description |
|---|---|---|---|
| stateBetterContext | key1 | identifier | the name of a previously-declared state that is a better context that is more likely to correctly handle the CAS-signaling event ANY_OTHER_EVT |
| sysRequestClosingOffWrongTentacle | key1 | identifier | the name of a previously-declared state that is a better context that is more likely to correctly handle the CAS-signaling event ANY_OTHER_EVT |
| key | Description | | |
| mode1 | The set of fields marked as key in this mode is sufficient to uniquely identify this transition regardless of context. | | |

Transitions for R2LINE_PCM

Historically, the CSM support for R2LINE_PCM signaling-system was developed prior to the CSM support for R2REGISTER signaling-system. The R2REGISTER signaling-system extended the CSM language statements in place for the R2LINE_PCM signaling-system. In certain CSM statements, such as XTRANSITION, ETRANSITION, and TTRANSITION, minor evolution occurred. Because of schedule pressure, the R2LINE_PCM versions of the XTRANSITION, ETRANSITION, and TTRANSITION statements remained out-of-synchronization with their evolved counterparts.

ETRANSITION: Defining a Transition Due to an Incoming Semantic CAS-Signal for R2LINE_PCM

TABLE 19

Example ETRANSITION statement in the CSM textual-language for R2LINE_PCM
ETRANSITION (fromState, toState, stimulusName, requestName[, exitTime]*)

| parameter name | key-mode / attribute | type | description |
|---|---|---|---|
| fromState | key1,2 | identifier | the name of a previously-declared state that is the origin of the transition from which this transition emanates |
| toState | key1 attribute2 | identifier | the name of a previously-declared state that is the destination of the transition to which this transition traverses |
| stimulusName | key1,2 | identifier | EVT_ . . . : When the VM receives a semantic-CAS-signaling-detected event, named stimulusName, while in the context of fromState, the VM is to traverse this transition to toState.<br>CMD_ . . . : When the VM receives a system-response command, named stimuluslName, while in the context of fromState, the VM is to traverse this transition to toState. No XTRANSITION for the same combination of CMD_ . . . , fromState, and toState is permitted. |
| requestName | attribute | identifier | SYS_ . . . : When the VM traverses this transition, the VM is to invoke the C++ function associated with delegation function requestName as a side-effect. |
| exitTime | attribute | identifier | optional. The maximum number of milliseconds that are permissible to stay in toState. Expiration precipitates the expiration of an unnamed system-timer to be processed via the TTRANSITION originating at toState. |
| key | description | | |
| mode1 | The set of fields marked as key in this mode is sufficient to uniquely identify this transition regardless of context. | | |
| mode2 | Given that state-machine's current state is in the context of fromState and given that VM receives received-CAS-signaling-event rsignalName from hardware/DSP, VM uses this key within this context to uniquely determine which transition out-going from fromState to traverse. | | |

XTRANSITION: Defining a Transition Due to an Incoming System-Response Command for R2LINE_PCM

TABLE 20

Example XTRANSITION statement in the textual-language for R2LINE_PCM
XTRANSITION (cmdName, fromState, toState, xsignalName[, exitTime]*)

| parameter name | key-mode / attribute | type | description |
|---|---|---|---|
| cmdName | key1,2 | identifier | CMD_ . . . : the name of the system-response command received by the VM from a delegation function's C++ function. No ETRANSITION for the same combination of CMD_ . . . , fromState, and toState is permitted. |

TABLE 20-continued

Example XTRANSITION statement in the textual-language for R2LINE_PCM
XTRANSITION (cmdName, fromState, toState, xsignalName[, exitTime]*)

| parameter name | key-mode / attribute | type | description |
|---|---|---|---|
| fromState | key1,2 | identifier | the name of a previously-declared state that is the origin of the transition from which this transition emanates |
| toState | key1 attribute2 | identifier | the name of a previously-declared state that is the destination of the transition to which this transition traverses |
| xsignalName | attribute | identifier | SIG_ . . . : the name of a previously-declared transmit-signal that is to be emitted as a side-effect by the VM when the VM traverses this transition |
| exitTime | attribute | identifier | optional. The maximum number of milliseconds that are permissible to stay in toState. Expiration precipitates the expiration of an unnamed system-timer to be processed via the TTRANSITION originating at toState. |
| key | description | | |
| mode1 | The set of fields marked as key in this mode is sufficient to uniquely identify this transition regardless of context. | | |
| mode2 | Given that state-machine's current state is in the context of fromState and given that VM receives system-response command cmdName from a delegation function's C++ function, VM uses this key within this context to uniquely determine which transition out-going from fromState to traverse. | | |

TTRANSITION: Defining a Transition Due to Expiration of an Unnamed System-Timer for R2LINE_PCM Each state-machine may have timed activities. These expiration of the timer may be either exceptional indicating an error (e.g., a supervision timer) or indicating that some other normal operation is to proceed. For example, in the R2LINE_PCM signaling-system, if a clear signal is transmitted but the remote-end's line-signaler did not acknowledge by sending a clear-back signal, then a supervision timer will expire, requiring the local line-signaler to take abortive action. This action may differ from one variant of line-signaling to another and/or from one signaling-system to another. For this reason, the exitTime parameter may be present in the ETRANSITION and XTRANSITION statements for R2LINE_PCM.

TABLE 21

Example TTRANSITION statement in the CSM textual-language for R2LINE_PCM
TTRANSITION (fromState, toState, requestName[, maxCount]?)

| parameter name | key-mode / attribute | type | Description |
|---|---|---|---|
| fromState | key1,2 | identifier | the name of a previously-declared state that is the origin of the transition from which this transition emanates |
| toState | key1 attribute2 | identifier | the name of a previously-declared state that is the destination of the transition to which this transition traverses |
| requestName | attribute | identifier | SYS_ . . . : When the VM traverses this transition, the VM is to invoke the C++ function associated with delegation function requestName as a side-effect. |
| maxCount | attribute | identifier | optional. The maximum number of times that this TTRANSITION may be traversed. If maxCount is exceeded, the VM places this state-machine into the Error state. |
| key | Description | | |
| mode1 | The set of fields marked as key in this mode is sufficient to uniquely identify this transition regardless of context. | | |
| mode2 | Given that state-machine's current state is in the context of fromState and given that VM receives system-response command cmdName from a delegation function's C++ function, VM uses this key within this context to uniquely determine which transition out-going from fromState to traverse. | | |

EXTEND: Extending a Generic Signaling System

A generic CAS-signaling system may be extended to create what can be referred to as topic-based variant. One or more topic variants can be merged, if multiple, and extended to form what can be referred to as a national-variant. The bulk of peculiarities of a variant may be housed in a topic-variant, which the national-variant may "extend" by: (1) closing off further extension via SIGPURGE statements, and (2) making a subset of the abstract signals concrete.

For example, for the Indonesia national-variant of R2-register-signaling, Indonesia's peculiarity of strictly requiring CPC requested by backward signals prior to CLI due to those requests sharing a common backward-signal (i.e., A-6), is deemed a topic that some other national-variant might also use. Some other national-variant may have the same peculiarity. Thus, this peculiarity is factored out as a topic-based variant, referred to as R2RegSigCpcThenCli (with identifiers suffixed with _CPCTHENCLI rather than suffixed _INDONESIA). As it turns out this is the only state-machine-topology peculiarity employed by Indonesia's variant of R2 register-signaling (i.e., all other peculiarities are in the domain of concrete signal representation handled via the XSIGNAL and RSIGNAL statements). Then, the R2RegSigIndonesia extends only R2RegSigCpcThenCli by: (1) closing off further extension via SIGPURGE statements and (2) making a subset of the abstract signals concrete.

Likewise, for the India national-variant of R2 register-signaling, India's peculiarity of requiring, as a prerequisite for querying the calling-party address, a negotiation of whether the upstream switch has the capability to convey the calling-party's address, is deemed a topic that some other national-variant might also use. Some other national-variant may have the same peculiarity. Thus, this peculiarity is factored out as a topic-based variant, referred to R2RegSigCliOpt (with identifiers suffixed with _CLIOPT rather than suffixed _INDIA). This is the only state-machine-topology peculiarity employed by India's variant of R2 register-signaling (i.e., all other peculiarities are in the domain of concrete signal representation handled via the XSIGNAL and RSIGNAL statements). Then, the R2RegSigIndia extends only R2RegSigCliOpt by: (1) by closing off further extension via SIGPURGE statements and (2) by making a subset of the abstract signals concrete.

Another national-variant of R2 register-signaling may specify both the CPC-then-CLI topic-based variant as well as the CLI-optional topic-based variant. These variants do not conflict. The .csm file defining the national-variant that specifies both of these topic-based variants may then contain the following statement, which may not have been possible had the topic-based variant not been factored out from the Indonesia and India national-variants: EXTEND (R2RegSigCpcThenCli, R2RegSigCliOpt).

The CPC-then-CLI topic-based variant (as used by Indonesia's national-variant, among others) may rely substantially, or entirely, on overriding generic R2 register-signaling transitions without the need to introduce even a single new state. Conversely, the CLI-optional topic-based variant (as used by India's national-variant, among others) needs to introduce additional states and undefine certain transitions without the need to override a single generic transition. These two schools of thought for extending generic CAS-signaling state-machine-topology is thought to address the tweaking needs of all foreseeable topic-based variants and, in turn, all foreseeable national-variants.

TABLE 22

Example EXTEND statement in the CSM textual language
EXTEND (name[, name]*)

| parameter name | type | description |
|---|---|---|
| name | basename | The basenames (i.e., filename without directory and without .csm file-extension) of a set of CAS signaling-system to extend to create the variant. There can be zero or one occurrences of the EXTEND statement in a single textual-language file. The presence of one occurrence of the EXTEND statement in a single .csm file declares that file to be a CAS-signaling variant. The absence of an EXTEND statement in a .csm file implicitly declares that file to be a generic CAS-signaling system. If there is a set of multiple names provided in the EXTEND statement, each member must ultimately extend the same SIGSYSTEM (e.g., R2 line-signaling and R2 register-signaling cannot be merged together and extended, whatever that might mean) and contain no conflicting extensions along any extension-path from the ancestral generic .csm file which contained the SIGSYSTEM statement through any intervening topic-variant extension textual-files that contained the EXTEND statement through the final national-variant textual-file. |

AUTOADJ: Automated Adjustment of
Enablement/Disablement of Transitions

TABLE 23

Example AUTOADJ statement in the CSM textual language
AUTOADJ (nameOfSetOfAutoAdjustmentTrigger, enableDisable, nameOfMemberAutoAdjustment)

| parameter name | key-mode / attribute | type | description |
|---|---|---|---|
| nameOfSetOfAutoAdjustmentTrigger | attribute1 | identifier | ADJ_topic_onOff_variantSuffix: the name of the type of delegation function in the textual language and in C++. Often when one signal is enabled, another is disabled. In that case the topic and the onOff are recommended to be from the perspective of what is being turned on. |
| enableDisable | key1 | keyword | ENABLE: When this set of automated adjustments are performed by the VM, enable nameOfMemberAutoAdjustment. DISABLE: When this set of automated adjustments are performed by the VM, enable nameOfMemberAutoAdjustment. |
| nameOfMemberAutoAdjustment | key1 | identifier | EVT_ . . . : the name of the receivable CAS-signaling event in the textual language and in C++ that is to be enabled/disabled. SIG_ . . . : the name of the transmittable CAS-signal in the textual language and in C++ that is to be enabled/disabled. |
| key | description | | |
| mode1 | unique identification of this automated-adjustment in the textual language and in C++ | | |

UTRANSITION: Undefining a Transition

Once either a ETRANSITION or an XTRANSITION has been defined in the generic state-machine, the UTRANSITION statement may instruct the VM to forget that previously-defined transition. This provides a variant of the CAS-signaling to turn off portions of the state-machine defined in the generic state-machine.

TABLE 24

Example UTRANSITION statement in the CSM textual language
UTRANSITION (stimulusName, fromState, toState)

| parameter name | key-mode / attribute | type | Description |
|---|---|---|---|
| stimulusName | key1 | identifier | CMD_ . . . : the name of the system-response command received by the VM from a delegation function's C++ function for the transition to undefine. The transition being undefined is either an ETRANSITION or an XTRANSITION.<br>EVT_ . . . : the name of the in-coming CAS-signaling event received by the VM from hardware/DSP for the transition to undefine. The transition being undefined is an ETRANSITION.<br>TMO_ . . . : the name of the in-coming CAS-signaling event received by the VM from hardware/DSP for the transition to undefine. The transition being undefined is an ETRANSITION. |
| fromState | key1 | identifier | the name of a previously-declared state that is the origin of the transition from which the transition to undefine emanates |
| toState | key1 | identifier | the name of a previously-declared state that is the destination of the transition to which the transition to undefine traverses |
| key | Description | | |
| mode1 | The set of fields marked as key in this mode is sufficient to uniquely identify this transition regardless of context. | | |

CSM Virtual Machine

The translator may translate the textual language into a binary-file, called the signaling descriptor .sig file. The VM uses the SDCs in the .sig file to govern run-time behavior.

In one embodiment, the translator is an engineering-time translation-tool that checks the textual language for integrity and cohesion. For example, once the textual-language representation of the state-machine is deemed of sufficient health, that engineering-time translation-tool generates a binary-file representation of the state-machine for memory-efficiency and/or run-time efficiency for use in the switch in field deployment. In the field, the state-machine in a sig file may be loaded dynamically at run-time to govern the operation of a particular variant of the CAS-signaling system. The binary layout of a .sig file may include an SDC file-header followed by a sequence of binary SDCs, where each binary SDC starts with a common SDC-header which may include, for example, the type of the SDC and the length of the SDC in bytes remaining after the common header.

For many of the textual-language statements, there may exist a corresponding binary SDC. Conversely, one or more textual-language statements (such as those whose purposes are limited to translation time, e.g., SIGGROUP) may not have any corresponding binary SDC. There may also be binary SDCs where each binary SDC aggregates information harvested from among multiple textual-language statements.

Although there may be substantial similarity between the fields of a statement in a CSM textual-language .csm file and the binary fields of a SDC in the binary.sig file, binary SDCs may contain a superset and/or subset of the information contained in textual-language statement, such as may be needed by efficiency or by internal data-structures.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
a plurality of transmission links collectively configured to transmit a plurality of communications each including at least one of voice data and signaling data corresponding to one of a plurality of signaling system variants;
a plurality of signaling definition files each corresponding to one of the plurality of signaling system variants; and
an associative device configured to associate each of the plurality of communications with a corresponding one of the plurality of signaling definition files, wherein the plurality of signaling definition files is stored in memory prior to receiving the plurality of communications, wherein each of the plurality of signaling definition files is dynamically loadable on an as-needed basis and includes commands and signaling event definitions usable, by a signaling interpreter, for processing signaling data associated with a corresponding communication.

2. The apparatus of claim 1 wherein the variants are region 2 (R2) signaling system variants.

3. The apparatus of claim 1 wherein the variants are channel associated signaling (CAS) signaling system variants.

4. The apparatus of claim 1 wherein the variants are common channel signaling (CCS) signaling system variants.

5. The apparatus of claim 1 wherein the variants correspond to at least one of inbound and outbound signaling.

6. The apparatus of claim 1 wherein the associative device is configured to associate each of the transmission links with a corresponding one or more of the signaling definition files.

7. The apparatus of claim 1 wherein the association of each of the plurality of communications with a corresponding one of the plurality of signaling definition files permits line and register signaling within a system in which the apparatus is located.

8. The apparatus of claim 1 wherein each signaling definition file is at least one of a line signaling definition file and a register signaling definition file.

9. The apparatus of claim 1 further comprising an input for dynamically-receiving the plurality of signaling definition files.

10. The apparatus of claim 1 further comprising at least one compiler function configured to compile one or more of the plurality of signaling definition files.

11. The apparatus of claim 1 further comprising at least one conversion function configured to convert at least one of a language, a format, and a protocol of at least one of the signaling definition files.

12. The apparatus of claim 1 further comprising at least one transcoding function configured to perform at least one of encoding, decoding, and transcoding of at least one of the signaling definition files.

13. The apparatus of claim 1 further comprising at least one translator function configured to translate at least one of the signaling definition files between first and second languages, wherein the first and second languages are each one of a programming language and a machine language.

14. The apparatus of claim 1 wherein the apparatus is a media gateway configured to perform switching.

15. A method, comprising:
 receiving a plurality of communications each corresponding to one of a plurality of signaling variants;
 associating each of the plurality of communications with one of a plurality of signaling definition files, wherein the plurality of signaling definition files is stored in memory prior to receiving the plurality of communications, wherein each of the plurality of signaling definition files is dynamically loadable on an as-needed basis and includes commands and signaling event definitions usable, by a signaling interpreter, for processing signaling data associated with a corresponding communication, wherein each of the signaling definition files corresponds to one of the signaling variants; and
 translating ones of the plurality of received communications by employing associated ones of the plurality of signaling definition files.

16. The method of claim 15 further comprising dynamically loading the signaling definition files.

17. The method of claim 15 wherein associating includes binding each of the communications with an associated one of the signaling definition files.

18. The method of claim 15 wherein the signaling definition files include at least one of a plurality of line signaling definition files and a plurality of register signaling definition files.

19. The method of claim 15 further comprising establishing a communication channel for each of the communications pursuant to the association of that communication with a corresponding one of the signaling definition files.

20. A method, comprising:
 receiving a communication corresponding to a signaling variant;
 associating the communication with a signaling definition file corresponding to the signaling variant, the plurality of signaling definition files is stored in memory prior to receiving the plurality of communications, wherein each of the plurality of signaling definition files is dynamically loadable on an as-needed basis and includes commands and signaling event definitions usable, by a signaling interpreter, for processing signaling data associated with a corresponding communication; and
 translating the received communication by employing the associated signaling definition file.

21. A non-transitory computer readable medium having stored thereon executable instructions that when executed by the processor of a computer control the computer to perform steps comprising:
 receiving a communication corresponding to a signaling variant;
 associating the communication with a signaling definition file corresponding to the signaling variant, wherein the plurality of signaling definition files is stored in memory prior to receiving the plurality of communications, wherein each of the plurality of signaling definition files is dynamically loadable on an as-needed basis and includes commands and signaling event definitions usable, by a signaling interpreter, for processing signaling data associated with a corresponding communication; and
 translating the received communication by employing the associated signaling definition file.

* * * * *